(12) United States Patent  
Takaki

(10) Patent No.: US 7,471,411 B2  
(45) Date of Patent: Dec. 30, 2008

(54) IMAGE PRINTING APPARATUS AND METHOD OF ADJUSTING AND CORRECTING MAIN-SCANNING OFFSET IN IMAGE PRINTING APPARATUS

(75) Inventor: Kouichi Takaki, Tokyo (JP)

(73) Assignee: Konica Minolta Holdings Inc., Tokyo (JP)

( * ) Notice: Subject to any disclaimer, the term of this patent is extended or adjusted under 35 U.S.C. 154(b) by 1037 days.

(21) Appl. No.: 10/692,268

(22) Filed: Oct. 23, 2003

(65) Prior Publication Data

US 2004/0085439 A1 May 6, 2004

(30) Foreign Application Priority Data

Oct. 29, 2002 (JP) ............................. 2002-314030  
Feb. 20, 2003 (JP) ............................. 2003-042280

(51) Int. Cl.  
*G06K 15/00* (2006.01)  
*B41J 2/205* (2006.01)

(52) U.S. Cl. ..................... 358/1.15; 358/474

(58) Field of Classification Search ............... 358/1.1, 358/1.3, 1.5, 1.7, 1.8, 1.9, 1.13, 1.15, 3.06, 358/474, 494, 496, 497, 505, 506; 382/166, 382/233, 248; 347/248, 258

See application file for complete search history.

(56) References Cited

U.S. PATENT DOCUMENTS 7,271,824 B2 * 9/2007 Omori et al. ............... 347/249  
2002/0085241 A1 * 7/2002 Izumiya et al. ............. 358/410  
2003/0067533 A1 * 4/2003 Omori et al. ............... 347/248

FOREIGN PATENT DOCUMENTS

JP 2000-199868 A 7/2000  
JP 2002-202648 A 7/2002

* cited by examiner

*Primary Examiner*—Gabriel I Garcia  
(74) *Attorney, Agent, or Firm*—Frishauf, Holtz, Goodman & Chick, P.C.

(57) ABSTRACT

This invention is directed to an image printing apparatus which can print images without any halfway offset or obverse/reverse pixel offset at a low cost. An image printing apparatus includes a clock generating section which generates a dot clock as the basis of each pixel forming an image, an image printing section which prints a one-line image in a main scanning direction in accordance with image data with reference to the dot clock output from the clock generating section, and prints a one-page image by repeating in the sub-scanning direction one-line image printing performed in the main scanning direction, and a clock control section which changeably controls the frequency of the dot clock during scanning of one line in the main scanning direction.

24 Claims, 14 Drawing Sheets

IMAGE PRINTING APPARATUS AND METHOD OF ADJUSTING AND CORRECTING MAIN-SCANNING OFFSET IN IMAGE PRINTING APPARATUS

BACKGROUND OF THE INVENTION

1. Field of the Invention

The present invention relates to an image printing apparatus which prints a one-line image in the main scanning direction in accordance with image data with reference to a dot clock as the basis of each pixel forming an image, and also prints a one-page image by repeating in the sub-scanning direction one-line image printing performed in the main scanning direction.

2. Description of the Prior Art

As an image printing apparatus, an apparatus for printing a one-line image in the main scanning direction in accordance with image data and printing a one-page image by repeating in the sub-scanning direction one-line image printing performed in the main scanning direction is known.

Image printing in the main scanning direction in accordance with image data is performed with reference to a clock signal (to be referred to as a "dot clock" hereinafter in this specification) as the basis of each pixel to be formed.

For example, in an electrophotographic image printing apparatus, a laser beam modulated in accordance with image data is scanned in the main scanning direction, and an image is concurrently formed on an image carrier rotating in the sub-scanning direction with the laser beam.

In this case, a laser beam is modulated with image data with reference to a clock signal (pixel clock) called a dot clock.

The arrangement of a writing unit as the main component of an image printing apparatus using a laser beam in this manner will be described with reference to FIG. 14.

In a writing unit circuit section 200, a laser diode (LD) 260 emits a laser beam LB on the basis of a laser driving signal LS generated on the basis of a dot clock.

The laser beam LB from the LD 260 passes through a collimator lens 261 and cylindrical lens 262 and is then scanned in the main scanning direction by a polygon mirror 263.

The laser beam LB scanned by the polygon mirror 263 is adjusted to be scanned at a constant velocity by an fè lens 264. The laser beam further passes through a cylindrical lens 265 to strike a photosensitive drum 10.

Sub-scanning operation is then performed by rotating the photosensitive drum 10 during this main-scanning operation. By repeating main-scanning operation in the sub-scanning direction, a one-page image is printed.

Note that part of the laser beam LB scanned by the polygon mirror is guided to an index sensor 266 to detect the timing.

In an image printing apparatus designed to print a one-page image by repeating such image printing operation, performed in the main scanning direction, in the sub-scanning direction, the main-scanning magnification (the magnification in the main scanning direction) may differ from a desired magnification due to the power characteristics and mount precision of various kinds of lens systems, the planarity and mount precision of various kinds of mirrors, the planarity and mount precision of a photosensitive drum as an image printing medium (image carrier), individual differences thereof, and the like. That is, an offset may occur in the main scanning direction.

An invention designed to change the frequency of a dot clock to adjust such a main-scanning magnification (eliminate an offset in the main scanning direction) is disclosed in, for example, patent reference 1 below.

A plurality of writing units may be provided for the above image printing apparatus to allow it to print a color image. In this case, if offsets in the main scanning direction occur between the respective writing units, a proper color image cannot be printed.

In order to eliminate such offsets in the main scanning direction, the frequency of a dot clock must be changed for each color. Conventional techniques of this type are disclosed in, for example, the following two patent references:

patent reference 1: Japanese Unexamined Patent Publication No. 2000-199868 (page 4; FIG. 7)

patent reference 2: Japanese Unexamined Patent Publication No. 2000-202648 (page 13; FIG. 1)

Repeated studies by the present inventors show that the following problems arise even though the main-scanning magnification is adjusted to coincide with the desired magnification by the techniques disclosed in the two patent references described above.

Even if the distance between the start and the end in the main scanning direction is made equal to a desired distance, a halfway point, e.g., an intermediate point between the start and the end, may not always coincide with a desired position.

In other words, in some case, although the two ends, i.e., the start and the end, coincide with desired positions, a slight offset (halfway offset) may have occurred between the two ends.

In the field of offset printing or the like, in particular, not only expansion/contraction between the start and the end but also a pixel offset at a halfway point (halfway offset) may pose serious problems.

The factors that cause such halfway offsets include the power characteristics and mount precision of various kinds of lens systems, the planarity and mount precision of various kinds of mirrors, the planarity and mount precision of a photosensitive drum as an image printing medium (image carrier), individual differences thereof, and the like. An enormous cost is required to manufacture and mount these components with high precision without causing any halfway offset.

In printing a color image, if such halfway offsets occur in different proportions among the respective colors, the offsets appear as noticeable color misregistration, posing a serious problem.

If the image printing apparatus is an image printing apparatus capable of printing images on the two surfaces of an image recording sheet, even if the distance between the start and the end in the main scanning direction is adjusted to a desired value, a user may recognize the difference between the distances on the two surfaces as an offset.

This is a case wherein an image recording sheet having images printed on its obverse and reverse surfaces is held up against light, an offset between the obverse and reverse surfaces is recognized. Obviously, in this case, a halfway offset may have occurred.

SUMMARY OF THE INVENTION

The present invention has been made to solve the above problems in the prior art, and has as its object to print images without any halfway offset or obverse/reverse pixel offset at a low cost.

In order to achieve the above object, according to the first aspect of the present invention, there is provided an image printing apparatus comprising a clock generating section which generates a dot clock as a basis of each pixel forming an image, an image printing section which prints a one-line image in a main scanning direction in accordance with image data with reference to the dot clock output from the clock generating section, and prints a one-page image by repeating in the sub-scanning direction one-line image printing performed in the main scanning direction, and a clock control section which changeably controls a frequency of the dot clock during scanning of one line in the main scanning direction.

According the first aspect, when a one-line image is printed in the main scanning direction in accordance with image data with reference to a dot clock and a one-page image is printed by repeating in the sub-scanning direction one-line printing performed in the main scanning direction, the frequency of the dot clock is changeably controlled during scanning of one line in the main scanning direction.

According to the second aspect of the present invention, there is provided an image printing apparatus, wherein the clock control section described in the first aspect controls even the number of pixels of one line in the main scanning direction in a case in which the frequency of the dot clock is changed during scanning of one line to be equal to that in a case in which the frequency is not changed.

According to the second aspect, even if the frequency of the dot clock is changed during scanning of one line, the number of pixels of one line in the main scanning direction in a case in which the frequency of the dot clock is changed is controlled to that in a case in which the frequency is not changed.

According to the third embodiment, there is provided an image printing apparatus, wherein the clock control section described in the first or second aspect changes the frequency of the dot clock during scanning of one line in the main scanning direction on the basis of a plurality of main-scanning partial offsets in a test image printed by the image printing apparatus in accordance with test image data.

According to the third aspect, the frequency of the dot clock is changed during scanning of one line in the main scanning direction on the basis of a plurality of partial main-scanning offsets in test images printed by the image printing apparatus in accordance with test image data.

According to the fourth aspect of the present invention, there is provided an image printing apparatus, wherein the image printing apparatus described in the first or second aspect further comprises an offset setting section which sets at least two offsets between distances between test patterns in test images printed by the image printing apparatus in accordance with test image data having test patterns arranged at at least three positions in the main scanning direction and reference distances between comparative test patterns, and the clock control section changes the frequency of the dot clock during scanning of one line in the main scanning direction on the basis of the respective offsets set by the offset setting section.

According to the fourth aspect, at least two offsets are set between the distances between test patterns in test images printed in accordance with test image data having test patterns arranged at at least three positions in the main scanning direction and the reference distances between comparative test patterns, and the frequency of the dot clock is changed during scanning of one line in the main scanning direction on the basis of the respective set offsets.

According to the fifth aspect of the present invention, there is provided an image printing apparatus, wherein the clock control section described in the fourth aspect changes the frequency of the dot clock to evenly distribute the offsets to the respective pixels between the test patterns so as to eliminate the offsets.

According to the fifth aspect, offsets are detected between three or more main-scanning test patterns used for image printing, and the frequency of the dot clock is changed to evenly distribute the offsets to the respective pixels so as to eliminate the offsets.

According to the sixth aspect of the present invention, there is provided an image printing apparatus described in the fourth or fifth aspect, wherein the image printing apparatus comprises a test patter interval detecting section which computes distances between the test patterns in the test images by detecting positions of the test patterns, and an offset computing section which computes offsets between the distances between the test patterns which are computed by the test pattern interval detecting section and the reference distances between the comparative test patterns, and at least two offsets computed by the offset computing section are set by the offset setting section.

According to the sixth aspect, the positions of test patterns are detected, and the distances between the test patterns are computed. The offsets between the computed distances between the test patterns and the reference distances between comparative test patterns are computed. At least two computed offsets are set by the offset setting section.

According to the seventh aspect of the present invention, there is provided an image printing apparatus described in any one of the fourth to sixth aspects, wherein the reference distances are distances between the test patterns in the test image data.

According to the seventh aspect, at least two offsets are set between the distances between test patterns in test images printed in accordance with test image data having test patters arranged at at least three positions in the main scanning direction and the reference distances between comparative test patterns, and the distances between the test patterns in the test image data are used as reference distances when the frequency of the dot clock is changed during scanning of one line in the main scanning direction on the basis of the respective set offsets.

According to the eighth aspect of the present invention, there is provided an image printing apparatus, wherein the image printing apparatus described in any one of the fourth to sixth aspect prints images on two surfaces of an image recording sheet, and the clock control section changes the frequency of the dot clock when an image is printed on one surface of the image recording sheet or images are printed on the two surfaces.

According to the eighth aspect, images can be printed on the two surfaces of an image recording sheet, and the frequency of the dot clock is changed when an image is to be printed on one surface of the image recording sheet or images are to be printed on the two surfaces.

According to the ninth aspect of the present invention, there is provided an image printing apparatus described in the eighth aspect, wherein the reference distances are distances between the test patterns in the test image data or distances between test patterns in test image data printed on a reverse surface of an image recording sheet when the frequency of the dot clock is changed in printing an image on an obverse surface of the image recording sheet, or the reference distances are distances between the test patterns in the test image data or distances between test patterns in test image data printed on the obverse surface of the image recording sheet when the frequency of the dot clock is changed in printing an image on the reverse surface of the image recording sheet.

According to the ninth aspect, at least two offsets are set between the distances between test patterns in test images printed in accordance with test image data having test patterns arranged at at least three positions in the main scanning direction and the reference distances between comparative test patterns, and the distances between the test patterns in the test images or the distances between test image data printed on the other surface are used as reference distances when the frequency of the dot clock is changed during scanning of one line in the main scanning direction on the basis of the respective set offsets.

According to the 10th aspect of the present invention, there is provided an image printing apparatus, wherein the image printing apparatus described in any one of the fourth to ninth aspects prints an image by superimposing an image formed in a first color and an image formed in a second color different from the first color, and the clock control section changes the frequency of the dot clock when one or both of images in the first and second colors are to be printed.

According to the 10th aspect, when an image is printed on an image recording sheet by using at least two colors, the frequency of the dot clock is changed for at least one of the colors.

According to the 11th aspect of the present invention, there is provided an image printing apparatus described in the 10 aspect, wherein the reference distances are distances between the test patterns in the test image data or distances between test patterns in test image data printed in the second color when the frequency of the dot clock is changed in printing an image in the first color, or the reference distances are distances between the test patterns in the test image data or distances between test patterns in test image data printed in the first color when the frequency of the dot clock is changed in printing an image in the second color.

According to the 11th aspect, at least two offsets are set between the distances between test patterns in test images printed in accordance with test image data having test patterns arranged at at least three positions in the main scanning direction and the reference distances between comparative test patterns, and the distances between the test patterns in the test images or the distances between test image data printed in the other color are used as reference distances when the frequency of the dot clock is changed during scanning of one line in the main scanning direction on the basis of the respective set offsets.

According to the 12th aspect of the present invention, there is provided an image printing apparatus described in any one of the first to 11th aspects, wherein the clock generating section comprises a fundamental clock generating section which generates a fundamental clock having a predetermined frequency, and a frequency changing section which can change the frequency of the fundamental clock generated by the fundamental clock generating section, and the clock control section changes a frequency of a fundamental clock output from the frequency changing section during scanning of one line in the main scanning direction.

According to the 12th aspect, the clock control section performs control to change the frequency of the fundamental clock output from the frequency changing section during scanning of one line in the main scanning direction.

According to the 13th aspect of the present invention, there is provided an image printing apparatus described in the 12th aspect, wherein the frequency changing section has a delay line which generates delay clocks by digitally delaying the fundamental clock, and the clock control section changes the frequency of the dot clock during scanning of one line in the main scanning direction by selecting a predetermined delay clock from the delay line.

According to the 13th aspect, the frequency changing section digitally delays the fundamental clock by the delay line, and the clock control section changes the frequency of the dot clock during scanning of one line in the main scanning direction by selecting a predetermined delay clock from the delay line.

According to the 14th aspect of the present invention, there is provided a main-scanning offset adjusting method for an image printing apparatus, which adjusts a main-scanning offset in the image printing apparatus which generates a dot clock as a basis of each pixel forming an image, prints a one-line image in a main scanning direction in accordance with image data with reference to the dot clock, and prints a one-page image by repeating in a sub-scanning direction one-line printing, performed in the main scanning direction, comprising the steps of printing test images in accordance with test image data having test patterns arranged at at least three positions in the main scanning direction, obtaining at least two offsets between distances between the test patterns in the test images and reference distances between comparative test patterns, and setting the respective offsets such that the frequency of the dot clock can be changed during scanning of one line in the main scanning direction on the basis of the respective offsets.

According to the 14th aspect, in main-scanning offset adjustment, test images are printed in accordance with test image data having test patterns arranged at at least three positions in the main scanning direction, and at least two offsets are obtained between the distances between the test patterns in the test images and the reference distances between comparative test patterns. The respective offsets are set such that the frequency of the dot clock can be changed during scanning of one line in the main scanning direction on the basis of the respective offsets.

According to the 15th aspect, there is provided a main-scanning offset correcting method for an image printing apparatus, which corrects a main-scanning offset in the image printing apparatus which generates a dot clock as a basis of each pixel forming an image, prints a one-line image in a main scanning direction in accordance with image data with reference to the dot clock, and prints a one-page image by repeating in a sub-scanning direction one-line printing, performed in the main scanning direction, comprising the steps of setting at least two offsets, before image printing, between distances between test patterns in test images printed in accordance with test image data having test patterns arranged at at least three positions in the main scanning direction and reference distances between comparative test patterns, and changing the frequency of the dot clock during scanning of one line in the main scanning direction on the basis of the respective offsets set in the offset setting step during image printing.

According to the 15th aspect, in main-scanning offset correction, before image printing, at least two offsets are set between the distances between test patterns in test images printed in accordance with test image data having test patterns arranged at at least three positions in the main scanning direction and the reference distances between comparative test patterns, and the frequency of the dot clock is changed during scanning of one line in the main scanning direction during image printing operation.

According to the 16th aspect of the present invention, there is provided an image printing apparatus including a clock generating section which generates a dot clock as a basis of each pixel forming an image, and an image printing section which prints a one-line image in a main scanning direction in accordance with image data with reference to the dot clock output from the clock generating section, and printing in the sub-scanning direction a one-page image by repeating one-line image printing performed in the main scanning direction, comprising a control section which controls image printing in the main scanning direction such that distances between test patterns in reference images which are arranged at at least three positions in the main scanning direction coincide with distances between test images printed in accordance with test image data corresponding to the reference images.

According to the 16th aspect, in image printing, image printing in the main scanning direction is controlled such that the distances between test patterns in reference images which are arranged at at least three positions in the main scanning direction coincide with distances between test images printed in accordance with test image data corresponding to the reference images.

According to the 17th aspect of the present invention, there is provided an image printing apparatus, wherein the control section described in the 16th aspect comprises a clock control section which changeably controls the frequency of the dot clock during scanning of one line.

According to the 17th aspect, in image printing, image printing in the main scanning direction is controlled during scanning of one line such that the distances between test patterns in reference images which are arranged at at least three positions in the main scanning direction coincide with distances between test images printed in accordance with test image data corresponding to the reference images.

According to the 18th aspect of the present invention, there is provided an image printing apparatus for printing images on two surfaces of an image recording sheet, which includes a clock generating section which generates a dot clock as a basis of each pixel forming an image, and an image printing section which prints a one-line image in a main scanning direction in accordance with image data with reference to the dot clock output from the clock generating section, and prints a one-page image by repeating in the sub-scanning direction one-line image printing, performed in the main scanning direction, wherein the frequency of the dot clock can be set to different frequencies depending on whether an image is to be printed on an obverse surface or reverse surface of an image recording sheet.

According to the 18th aspect, when a one-line image is printed in a main scanning direction in accordance with image data with reference to a dot clock, and a one-page image is printed on each of the two surfaces of an image recording sheet by repeating in the sub-scanning direction one-line image printing performed in the main scanning direction, the frequency of the dot clock can be set to different frequencies depending on whether an image is to be printed on the obverse or reverse surface of the image recording sheet.

According to the 19th aspect of the present invention, there is provided an image printing apparatus including a clock generating section which generates a dot clock as a basis of each pixel forming an image, a toner image forming section which includes a writing section which forms a one-line image in a main scanning direction in accordance with image data with reference to the dot clock output from the clock generating section, and forms a one-page image by repeating in the sub-scanning direction one-line image printing performed in the main scanning direction, the toner image forming section which forms a toner image on one surface of an image recording sheet, and a fixing section which fixes the toner image formed by the toner image forming section on the image recording sheet, the image printing apparatus printing images on two surfaces of the image recording sheet by causing the toner image forming section to form a toner image on a reverse surface of the image recording sheet having the toner image formed on one surface and causing the fixing section to fix the image, wherein the frequency of the dot clock can be set to different frequencies depending on whether an image is to be printed on an obverse surface or reverse surface of an image recording sheet.

According to the 19th aspect, when a one-line image is printed in a main scanning direction in accordance with image data with reference to a dot clock, and a one-page image is printed on each of the two surfaces of an image recording sheet by repeating in the sub-scanning direction one-line image printing performed in the main scanning direction, the toner image on the reverse surface is fixed after the toner image formed on the obverse surface is fixed. The frequency of the dot clock can be set to different frequencies depending on whether an image is to be printed on the obverse or reverse surface of the image recording sheet.

According to the 20th aspect of the present invention, there is provided an image printing apparatus described in the 19th aspect, wherein the frequency of the dot clock can be set to a given frequency when an image is to be printed on at least one of obverse and reverse surfaces of an image recording sheet.

According to the present invention, when a one-line image is printed in a main scanning direction in accordance with image data with reference to a dot clock, and a one-page image is printed on each of the two surfaces of an image recording sheet by repeating in the sub-scanning direction one-line image printing performed in the main scanning direction, the toner image on the reverse surface is fixed after the toner image formed on the obverse surface is fixed. When an image is to be printed on at least one of the obverse and reverse surfaces of the image recording sheet, the frequency of the dot clock can be set to different frequencies depending on whether an image is to be printed on the obverse or reverse surface of the image recording sheet.

As is obvious from the above aspects, according to the present invention, the following effects can be obtained.

(1) In the first aspect, since the frequency of the dot clock can be changed even during scanning of one line, not only the starts and ends of lines can be aligned, but also a pixel offset (halfway offset) in an intermediate portion can be adjusted. Therefore, an image can be printed without any halfway offset at a low cost.

(2) In the second aspect, since the frequency of the dot clock can be changed even during scanning of one line, and the number of pixels of one line in the main scanning direction is controlled to a predetermined number, not only the starts and ends of lines can be aligned, but also a pixel offset (halfway offset) in an intermediate portion can be adjusted. Therefore, an image can be printed without any halfway offset at a low cost.

(3) In the third aspect, since the frequency of the dot clock is changed during scanning of one line in the main scanning direction on the basis of the partial offsets detected by printing test images, a pixel offset (halfway offset) in an intermediate portion can be adjusted. Therefore, an image without any halfway offset can be printed at a low cost.

(4) In the fourth aspect, since offset correction is executed by detecting offsets (error information) at three or more positions in the main scanning direction, not only the starts and ends of lines can be aligned, but also a pixel offset (halfway offset) in an intermediate portion can be properly adjusted.

(5) In the fifth aspect, pieces of error information are detected at three or more positions in the main scanning direction, and dot clocks are set in accordance with this detection to evenly distribute the pieces of error information to the respective pixels between the respective test patterns. This makes it possible to properly adjust a pixel offset in an intermediate portion as well as aligning the starts and ends of lines.

(6) In the sixth aspect, the distances between test patterns are computed in advance, and offset correction is executed by detecting offsets (error information) at three or more positions in the main scanning direction. This makes it possible to properly adjust a pixel offset (halfway offset) in an intermediate portion as well as aligning the starts and ends of lines.

(7) In the seventh aspect, offset correction is executed by detecting offsets (error information) at three or more positions in the main scanning direction using the distances between test patterns in test image data as reference distances. This makes it possible to properly adjust a pixel offset (error information) in an intermediate portion as well as aligning the starts and ends of lines.

(8) In the eighth aspect, in the image printing apparatus capable of printing images on the two surfaces of an image recording sheet, since the frequency of a dot clock is changed, a pixel offset (halfway offset) in an intermediate portion can be adjusted. In addition, an offset between the two surfaces can be adjusted.

(9) In the ninth aspect, in double-side image printing, offset correction is executed by detecting offsets (error information) at three or more positions in the main scanning direction using the distances between test patterns in test image data or the distances between test patterns printed on the other surface as reference distances. This makes it possible to properly adjust a pixel offset (error information) in an intermediate portion as well as aligning the starts and ends of lines. In addition, an obverse/reverse pixel offset can also be properly adjusted.

(10) In the 10th aspect, when images are to be printed in at least two colors on an image recording sheet, the frequency of a dot clock is changed for at least one of the colors.

In the image printing apparatus capable of printing an image in a plurality of colors, a pixel offset between the respective colors can be adjusted by changing the frequency of the dot clock for any one of the colors. In addition, a pixel offset between the respective colors on the two surfaces can also be adjusted.

(11) In the 11th aspect, in double-side image printing, offset correction is executed by detecting offsets (error information) at three or more positions in the main scanning direction using the distances between test patterns in test image data or the distances between test patterns printed in the other color as reference distances. This makes it possible to properly adjust a pixel offset (error information) in an intermediate portion as well as aligning the starts and ends of lines. In addition, a pixel offset between the respective colors on the obverse and reverse surfaces can also be properly adjusted

(12) In the 12th aspect, since the frequency of a dot clock can be changed even during scanning of one line under the control of the clock control section, not only the starts and ends of lines can be aligned, but also a pixel offset (halfway offset) in an intermediate portion can be adjusted. Therefore, an image can be printed without any halfway offset at a low cost.

(13) In the 13th aspect, since the frequency of a dot clock can be arbitrarily changed even during scanning of one line by selecting a desired one of delay clocks delayed the delay line, not only the starts and ends of lines can be aligned, but also a pixel offset (halfway offset) in an intermediate portion can be adjusted. Therefore, an image can be printed without any halfway offset at a low cost.

(14) In the 14th aspect, offset adjustment in the main scanning direction can be properly performed by setting offsets so as to allow the frequency of a dot clock to be changed during scanning of one line in the main scanning direction.

(15) In the 15th aspect, in image printing, offset correction in the main scanning direction can be properly performed by changing the frequency of a dot clock during scanning of one line in the main scanning direction on the basis of at least two offsets set before image printing.

(16) In the 16th aspect, in image printing, offset correction in the main scanning direction can be properly performed by controlling the frequency of a dot clock so as to make the distances between test patterns at three positions coincide with each other.

(17) In the 17th aspect, in image printing, offset correction in the main scanning direction can be properly performed by controlling the frequency of a dot clock during scanning of one line in the main scanning direction so as to make the distances between test patterns at three positions coincide with each other.

(18) In the 18th aspect, the frequency of a dot clock can be set to different frequencies depending on whether an image is to be printed on the obverse or reverse surface of an image recording sheet. This makes it possible to adjust an offset between the two surfaces.

(19) In the 19th aspect, the frequency of a dot clock can be set to different frequencies depending on whether images are to be printed on the two surfaces by repeatedly forming and fixing a toner image on each of the surfaces or an image is to be printed on the reverse surface of an image recording sheet. This makes it possible to properly adjust an offset between the two surfaces.

(20) In the 20th aspect, the frequency of a dot clock can be set to a given frequency for at least one surface depending on whether images are to be printed on the two surfaces by repeatedly forming and fixing a toner image on each of the surfaces or an image is to be printed on the reverse surface of an image recording sheet. This makes it possible to relatively make adjustment on the two surfaces and hence properly adjust an offset between the two surfaces.

The above and many other objects, features and advantages of the present invention will become manifest to those skilled in the art upon making reference to the following detailed description and accompanying drawings in which preferred embodiments incorporating the principle of the invention are shown by way of illustrative examples.

DETAILED DESCRIPTION OF THE PREFERRED EMBODIMENTS

A few preferred embodiments of the present invention will be described below with reference to the accompanying drawings.

Note that in the present invention, changing the frequency of a dot clock means changing the leading or trailing edge timing of the dot clock to a desired timing such as a given timing during scanning of one line or a timing corresponding to each image printing surface or image printing color in order to change the position of a pixel printed in accordance with the dot clock. As techniques of changing the frequency of a dot clock, there are available a technique of changing or switching the frequency of the dot clock at an arbitrary timing and a technique of generating a dot clock whose timing changes by selecting one of a plurality of dot clocks with the same frequency and different timings (phases).

The following embodiment will be described by exemplifying the use of the technique of generating dot clocks which change in timing by selecting dot clocks from a plurality of dot clocks with the same frequency and different timings (phases).

First Embodiment

The overall arrangement of an image printing apparatus to which the first embodiment is applied will be described first.

Figure 7:
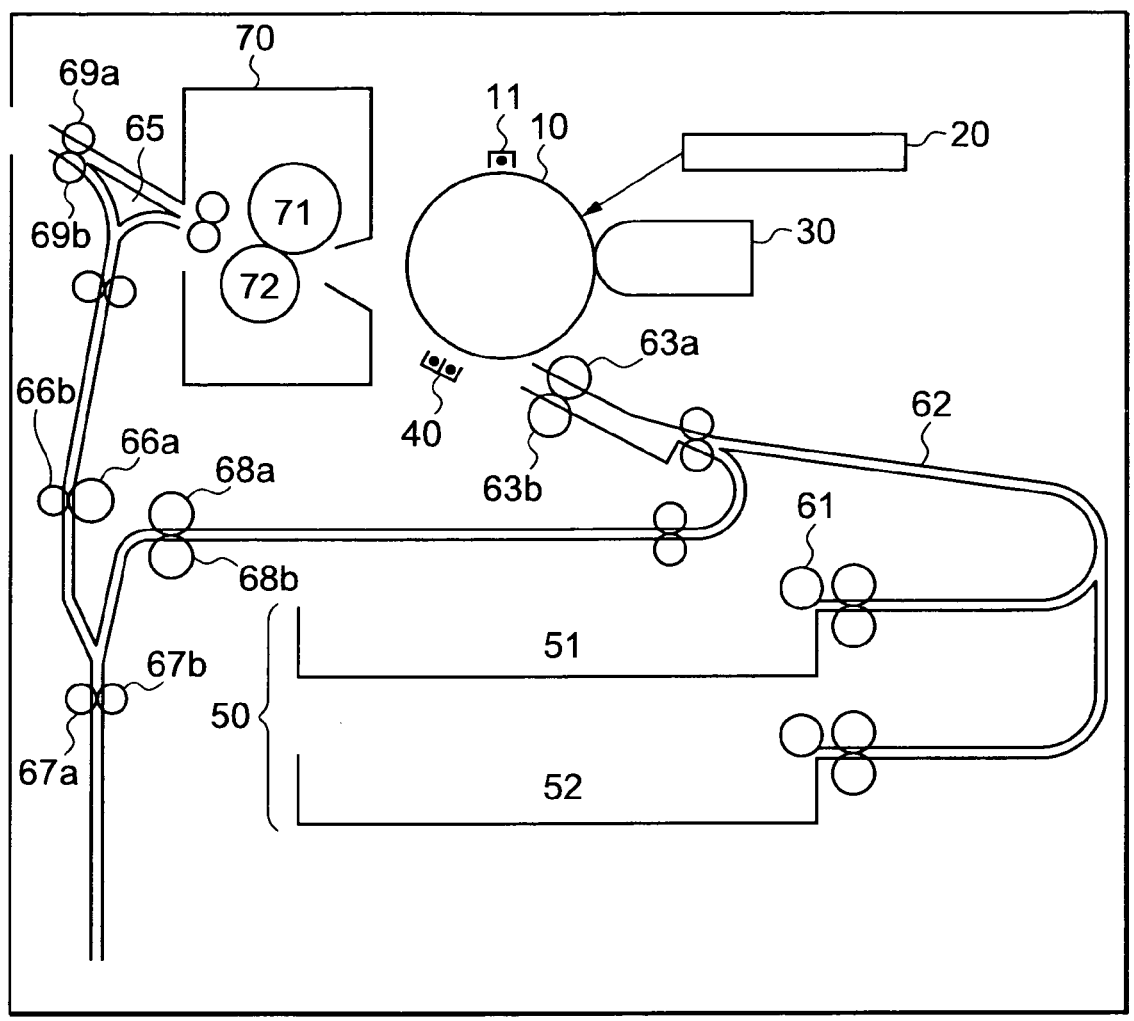
FIG. 7 is a sectional view showing the arrangement of a writing section of the image printing apparatus according to the first embodiment of the present invention.

The image printing apparatus scans a laser beam modulated in accordance with image data in the main scanning direction, and forms an image on an image carrier which rotates in the sub-scanning direction. In this case, the laser beam is modulated with the image data with reference to a pixel clock called a dot clock. FIG. 7 is a view showing the arrangement of the print engine of the image printing apparatus according to this embodiment.

FIG. 7 shows the image printing apparatus capable of printing images on the two surfaces of an image recording sheet as a specific example. Note that the image printing apparatus capable of printing images on the two surfaces of an image recording sheet can print an image on only one surface of an image recording sheet.

Referring to FIG. 7, reference numeral 10 denotes a photosensitive drum serving as an image carrier on which a toner image is formed; and 11, a charging electrode for applying a predetermined potential to the photosensitive drum 10.

Reference numeral 20 denotes a writing unit for forming an electrostatic latent image on the surface of the photosensitive drum 10 by scanning a laser beam in accordance with image information.

Reference numeral 30 denotes a developing device for forming a toner image by developing the electrostatic latent image formed on the surface of the photosensitive drum 10 with a developer (toner).

Reference numeral 40 denotes a transfer/separation electrode for transferring the toner image from the photosensitive drum 10 to an image recording sheet, and separating the transfer sheet from the photosensitive drum 10. Note that an illustration of a cleaning section and the like is omitted.

Reference numeral 50 denotes a paper feed section in which image recording sheets are stored. FIG. 7 shows paper feed cassettes 51 and 52 of the paper feed section 50. Note that the number of paper feed cassettes is not limited to this.

Reference numerals 61 to 68 denote convey devices such as convey rollers and path switching device. Reference numeral 61 denotes a feed roller for feeding an image recording sheet from a paper feed cassette; 62, a convey path along which an image recording sheet from the paper feed section 50 (51 or 52) travels; 63a and 63b, registration rollers for feeding an image recording sheet at the timing of image printing; 65, a path switching device which switches between delivery and circulation of an image recording sheet; 66a, 66b, 67a, 67b, 68a, and 68b, inversion rollers for inverting the obverse and reverse surfaces of an image recording sheet; and 69a and 69b, delivery rollers for delivering an image recording sheet outside the apparatus.

Reference numeral 70 denotes a fixing unit for fixing (heat fusing) a toner image on an image recording sheet with heat and pressure. The fixing unit 70 fixes a toner image on an image recording sheet while clamping/conveying it with a heat roller 71 (or 72) and a pressure roller 72 (or 71).

Figure 14:
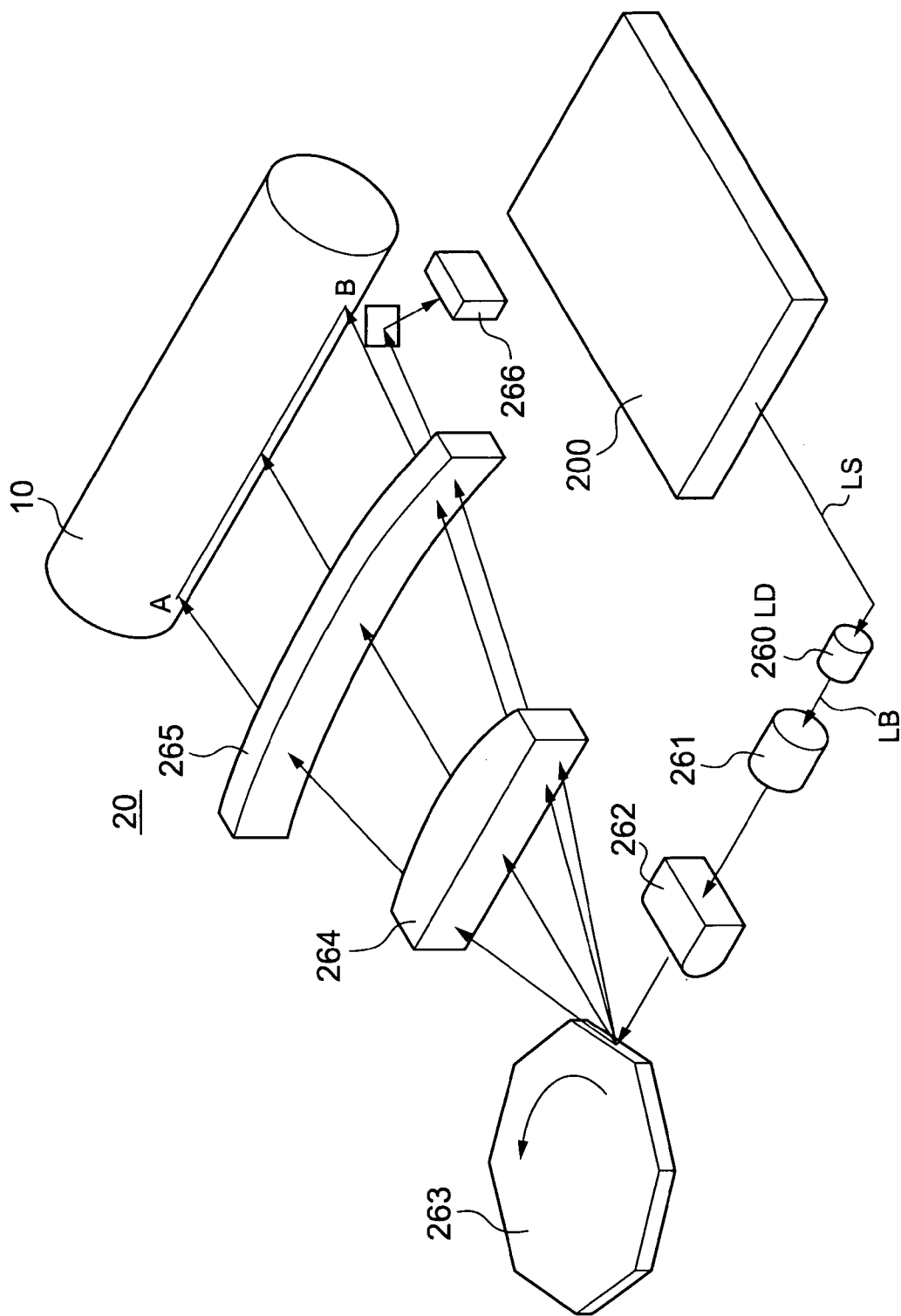
FIG. 14 is a perspective view showing a general arrangement of a writing section of an image printing apparatus.

The first embodiment of the image printing apparatus will be described in detail below with reference to the accompanying drawings. Note that the image printing apparatus shown in FIGS. 14 and 7 is assumed as a specific example of the image printing apparatus according to this embodiment. That is, the image printing apparatus of the first embodiment is an image printing apparatus capable of printing an image on at least one surface of an image recording sheet. Note that this apparatus may either be a monochrome image printing apparatus or color image printing apparatus.

The first embodiment of the image printing apparatus will be described in detail below.

Figure 1:
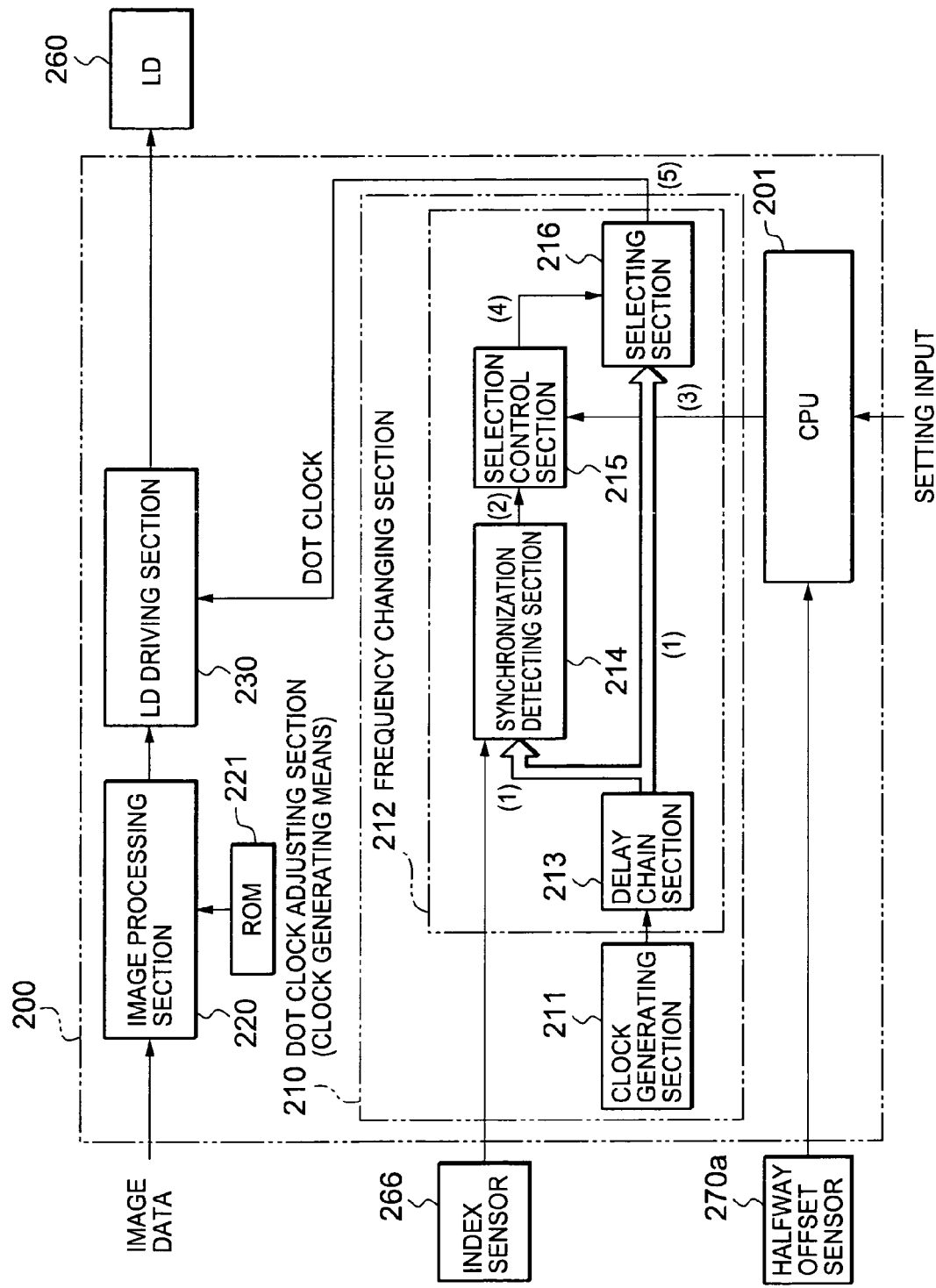
FIG. 1 is a bock diagram showing the electrical arrangement of the main part of an image printing apparatus according to the first embodiment of the present invention.

FIG. 1 shows a writing unit circuit section 200, an LD 260 for exposure, an index sensor 266, and a halfway offset sensor 270a.

The writing unit circuit section 200 of the writing unit 20 forms an electrostatic latent image on the surface of the photosensitive drum 10 (see FIG. 7) by scanning a laser beam in accordance with image data.

Referring to FIG. 1, the writing unit circuit section 200 includes a CPU 201 serving as a controller for controlling the overall image printing apparatus, a dot clock adjusting section 210 which is a characteristic feature of the first embodiment, an image processing section 220 for performing image processing, and an LD driving section 230 for generating an LD driving signal in accordance with a dot clock on the basis of an image processing result.

Assume that the halfway offset sensor 270a is placed downstream of the fixing unit 70 to detect pixel offsets at three or more positions in the main scanning direction and read predetermined patterns after fixing.

In this case, the predetermined pattern means a test image printed in accordance with test image data stored in advance.

The arrangement and operation of the dot clock adjusting section 210 will be sequentially described below. Not that the dot clock adjusting section 210 is a clock generating section in the claims. The dot clock adjusting section 210 is comprised of a clock generating section 211 for generating a fundamental clock and a frequency changing section 212 capable of changing the frequency of the fundamental clock generated by the clock generating section 211. In this case, the frequency changing section 212 changes the leading or trailing edge timing or frequency of a dot clock to a desired timing such as a given timing during scanning of one line or a timing corresponding to each image printing surface or image printing color in order to change the position of a pixel printed in accordance with the dot clock. In this embodiment, the frequency changing section 212 is formed from a digital delay type dot clock adjusting device, and is comprised of (A), (B), (C), and (D) described below.

(A) Delay Signal Generation:

A delay chain section 213 is a delay element group for obtaining a plurality of delay signals (delay signal group: in FIG. 1) having slightly different phases from each other by delaying an input signal (the fundamental clock from the clock generating section 211).

In this case, in the delay chain section 213, delay elements are preferably cascaded in the form of a chain to connect a sufficient number of delay elements to generate delay signals having slightly different phases from each other over two fundamental clock periods.

Although the clock generating section 211 may be incorporated in each of clock generating circuits for the respective colors, i.e., Y, M, C, and K, in a case of a color image printing apparatus, fundamental clocks may be distributed from the single clock generating section 211 to the clock generating circuits for the respective colors.

As has already been shown in FIG. 14, the index sensor 266 detects an exposure timing at a reference position in scanning of a laser beam, and generates an index signal indicating the timing.

(B) Synchronization Detection:

A synchronization detecting section 214 is a detecting section which receives the index signal generated by the index sensor 266 and detects the ordinal number of a delay signal (synchronization point), of a delay signal group (in FIG. 1), which is synchronized with the index signal. This section outputs synchronization point information (in FIG. 1).

In this case, the synchronization detecting section 214 preferably outputs first synchronization point information SP1 indicating a delay signal, of the delay signal group (in FIG. 1), which is synchronized first with the index signal, and second synchronization point information SP2 indicating a delay signal synchronized next with the index signal.

Since a plurality of delay signals from the delay chain section 213 may greatly vary in delay time due to the influences of temperature changes and the like, how many delay signals are included in a predetermined unchanging time (the time interval between an index signal and another index signal) is detected in advance in this manner. This makes it possible to calculate back the delay time per delay signal of a delay signal group.

(C) Selection Control:

A selection control section 215 obtains a synchronization correction amount on the basis of synchronization point information (in FIG. 1) from the synchronization detecting section 214 and frequency offset information (in FIG. 1) from the CPU 201, and outputs a select signal (in FIG. 1) indicating a delay signal having a specific phase which is to be selected from a delay signal group (in FIG. 1). The frequency offset information will be described later.

(D) Selection:

A selecting section 216 receives a select signal in FIG. 1) from the selection control section 215, and selects a delay signal having a corresponding phase from a delay signal group (in FIG. 1). The selecting section 216 then generates a rectangular wave by setting the selected delay signal as leading and trailing edges, and outputs the rectangular wave as a dot clock (in FIG. 1).

In this manner, the period of a dot clock is slightly increased or decreased by setting a delay signal having a selected timing as leading and trailing edges in generating a dot clock. This can realize (a) and (b) described below.

(a) Generating a signal having a predetermined number of pulses generated in a predetermined period of time makes the length of each line in the main scanning direction uniform and makes the length between the start and the end of each line constant.

(b) The timing of a dot clock is adjusted at three or more positions in the main scanning direction by using pieces of error information at the three or more positions in the main scanning direction, thereby suppressing a halfway offset.

Not only (a) but also (b), which is unfeasible in the prior art, can be realized by sequentially selecting delay signals, whose phases (the positions or timings of the pulses of a dot clock) are finely and gradually changed, within a predetermined period of time without changing the clock frequency itself instead of making adjustment by finely adjusting the oscillation frequency of a fundamental clock oscillated and generated by the clock generating section 211.

<Principle (1) of Offset Detection for Dot Clock Adjustment>

The manner of offset detection in the first embodiment will be briefly described below with reference to the flow chart of FIG. 2 and the schematic view of FIG. 3.

Figure 2:
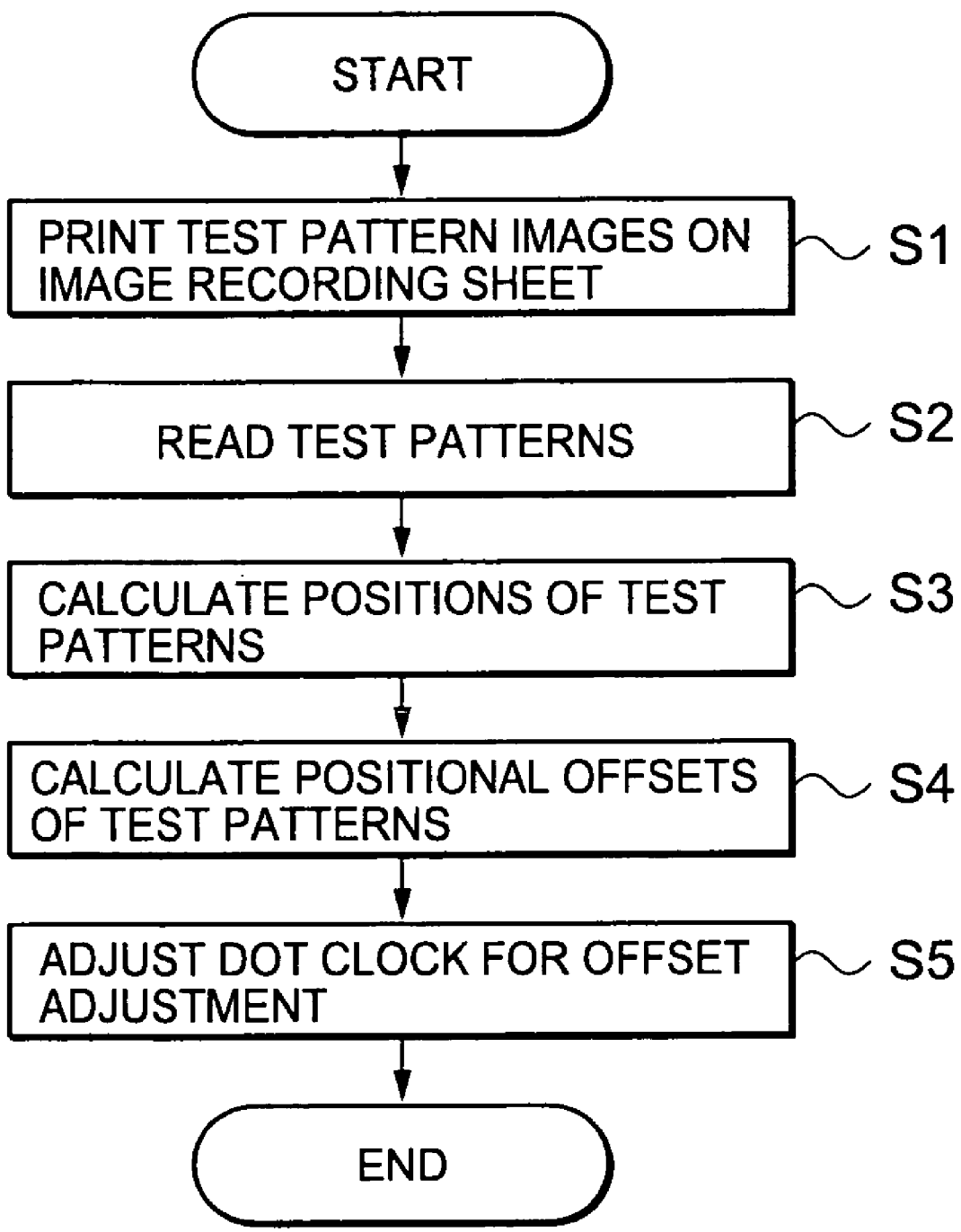
FIG. 2 is a flow chart for explaining the operation state of the image printing apparatus according to the first embodiment of the present invention.

At the time of offset detection, the writing unit circuit section 200 generates images with predetermined patterns stored in a ROM 221 at a total of three or more positions, i.e., the start position, end position, and intermediate position on the photosensitive drum 10 in the main scanning direction (S1 in FIG. 2). FIG. 3 shows a case wherein patterns in the form of the Katakana character "ア" are printed as predetermined patterns at three positions in the main scanning direction.

Assume that although the patterns indicated by the solid lines are actually printed on the image recording sheet, the patterns indicated by the broken lines were expected to be printed. In this case, offsets dx1, dx2, and dx3 have occurred with respect to the respective patterns in the main scanning direction due to the aberrations of the writing unit and the respective optical systems, contraction due to fixing, and the like.

When these patterns are read by the halfway offset sensor 270a disposed at a position where it can read the patterns on the image recording sheet having passed through the fixing unit 70 (S2 in FIG. 2), a distance Y1' from the horizontal line to the oblique line of the pattern in the form of the Katakana character "ア" includes an offset dy1, and distances Y2' and Y3' respectively include offsets dy2 and dy3.

Letting è be the angle defined by the horizontal and oblique lines, dx1=dy1/tanè. In addition, the offset dy1 can also be obtained from the moving speed of the image carrier in the sub-scanning direction and the difference between the times when the horizontal and oblique lines are read.

Likewise, letting è be the angle defined by the horizontal and oblique lines, dx2=dy2/tanè. Furthermore, the offset dy2 can be obtained from the moving speed of the image carrier in the sub-scanning direction and the difference between times when the horizontal and oblique line are read.

Likewise, letting è be the angle defined by the horizontal and oblique lines, dx3=dy3/tanè. Furthermore, the offset dy3 can be obtained from the moving speed of the image carrier in the sub-scanning direction and the difference between times when the horizontal and oblique line are read.

In the above manner, the positions (offset states) of the test patterns are calculated by the CPU 201 (S3 in FIG. 2).

The CPU 201 compares the positions (offset states) of the test patterns with the reference distances based on the test patterns to calculate pixel offset states within the image recording sheet surface (S4 in FIG. 2).

Therefore, by printing and reading such predetermined patterns on one surface of an image recording sheet at the same position in the sub-scanning direction and three or more positions in the main scanning direction, the CPU 201 can detect offset states (frequency offset information) associated with the expansion/contraction of an image and pixel offsets in the main scanning direction.

The CPU 201 performs the above detection processing with respect to one surface of the image recording sheet in this manner, and supplies frequency offset information (in FIG. 1) to the selection control section 215 of the writing unit circuit section 200.

Likewise, the CPU 201 can obtain image leading end offset information associated with the start position of an image in the main scanning direction by detecting the pattern in the form of the Katakana character "フ" on the start end side in the main scanning direction, and can supply the image leading end offset information to the selection control section 215 in the writing unit circuit section 200.

In the above manner, in usual image printing operation, on the basis of frequency offset information representing a pixel offset state on one surface, the dot clock adjusting section 210 generates a dot clock for eliminating a halfway offset which is the pixel offset state on one surface of the image recording sheet, thereby printing an image (S5 in FIG. 2)

<Operation of Image Printing Apparatus>

The operation of the image printing apparatus according to the first embodiment will be described next with reference to the timing chart of FIG. 4.

<Operation of Digital Delay Type Dot Clock Adjustment>

The operation of making adjustment to set the pulse count to a predetermined count by shifting the pulse of a fundamental clock with reference to offset information and to set the time during which the predetermined number of pulses are generated to a predetermined time, and suppressing a halfway offset by adjusting the dot clock timing at three or more positions in the main scanning direction will be described up to the step of generating a dot clock, first, with reference to FIG. 4.

The CPU 201 supplies a correction amount computing section in the selection control section 215 with offset information representing an offset ER detected by the above printing and reading of the predetermined patterns, clock frequency information of a clock period TC obtained from the frequency of a fundamental clock, one-line pixel count information representing a pixel count PH of pixels to be printed in the main scanning direction.

In addition, a synchronization count (a count by which a delay of one fundamental clock period) NS is obtained from the first synchronization point information SP1 and second synchronization point information SP2 from the synchronization detecting section 214.

In this case, the correction amount computing section in the selection control section 215 obtains a correction count value (count load data) CC corresponding to a correction amount by $$CC=PH\times(NS/TC)/ER$$

This correction count value CC is counted down by a switching count device in the selection control section 215 to switch between a select signal and a low-order select signal. As the correction amount increases, therefore, the correction count value CC decreases.

The synchronization detecting section 214 refers to the leading edge of an index signal from the index sensor 266 to obtain, as synchronization point information, the ordinal number of a delay element of the delay chain section 213 at which a delay signal synchronized with the leading edge of the index signal is obtained.

Assume that 20 and 50 are obtained as the first synchronization point information SP1 and second synchronization point information SP2, respectively. In this case, the above synchronization count NS becomes 30.

Figure 4:
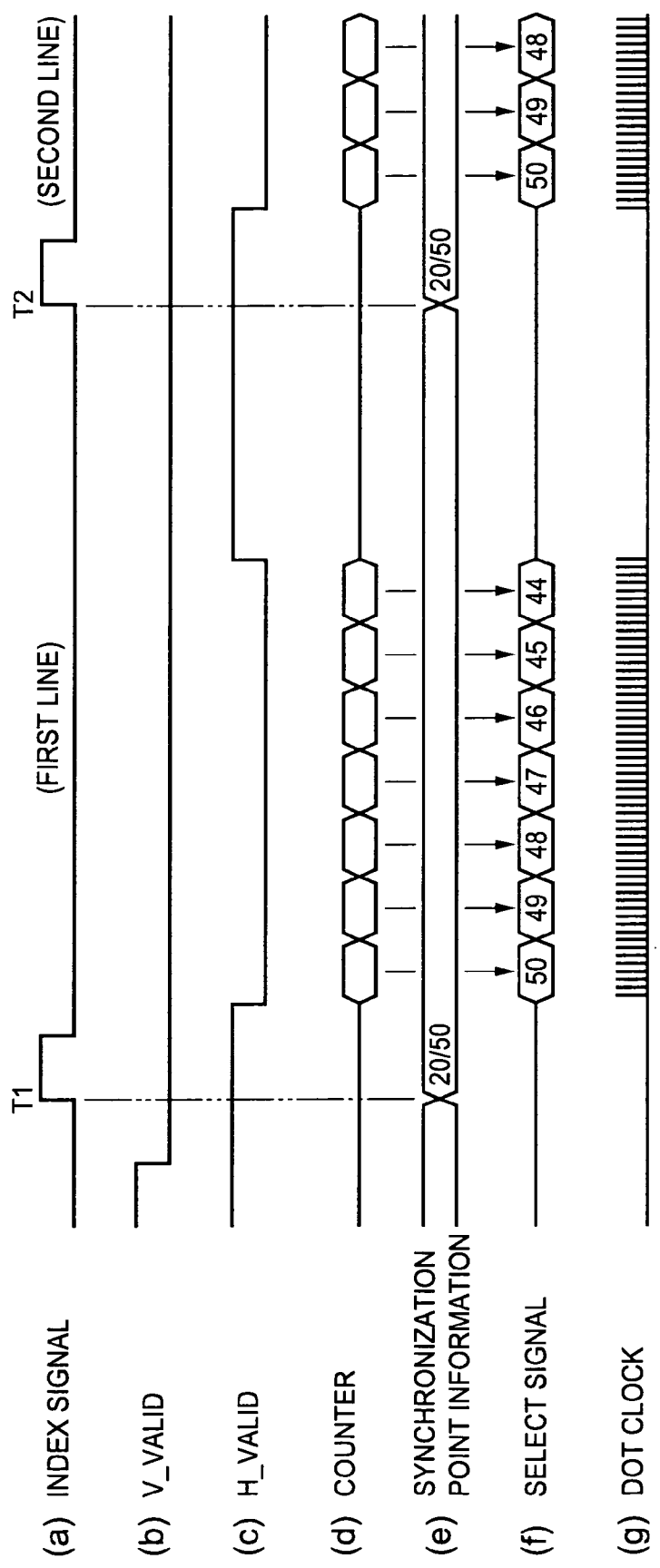
FIG. 4 is a timing chart for explaining the operation of the image printing apparatus according to the first embodiment of the present invention.

In this case, an index signal is generated at the timing when the index sensor detects a laser beam scanned by the writing unit (T1 of (a) in FIG. 4). Thereafter, H_VALID representing a valid area in the horizontal direction is activated.

The switching count device in the selection control section 215 keeps counting down the correction count value CC in accordance with a fundamental clock. Every time the count values is counted down to 0, count data is supplied as an interrupt to a select signal computing section 443 in the selection control section 215 ((d) to (f) in FIG. 4).

The CPU 201 supplies offset direction information to the select signal computing section in the selection control section 215. More specifically, the CPU 201 supplies "−correction" information for making correction to contract an offset as image expansion in the main scanning direction, and "+correction" information for making correction to expand an offset as image contraction.

Assume that offset information ER and offset direction information have been obtained by printing and measuring the predetermined patterns described above. In this case, ER=6 ns and offset direction information="−correction". That is, assume that the obtained information indicates making correction to contract the image because of its expansion.

First of all, the synchronization detecting section 214 obtains the first synchronization point information SP1 and second synchronization point information SP2 by referring to the leading edge of an index signal from the index sensor 266.

The first synchronization point information SP1 indicates the ordinal number of a delay element of the delay chain section 213 which is synchronized with the leading edge of the index signal. The second synchronization point information SP2 indicates the ordinal number of a delay element of the delay chain section 213 which lags behind the first synchronization point information SP1 by one fundamental clock period.

Figure 5:
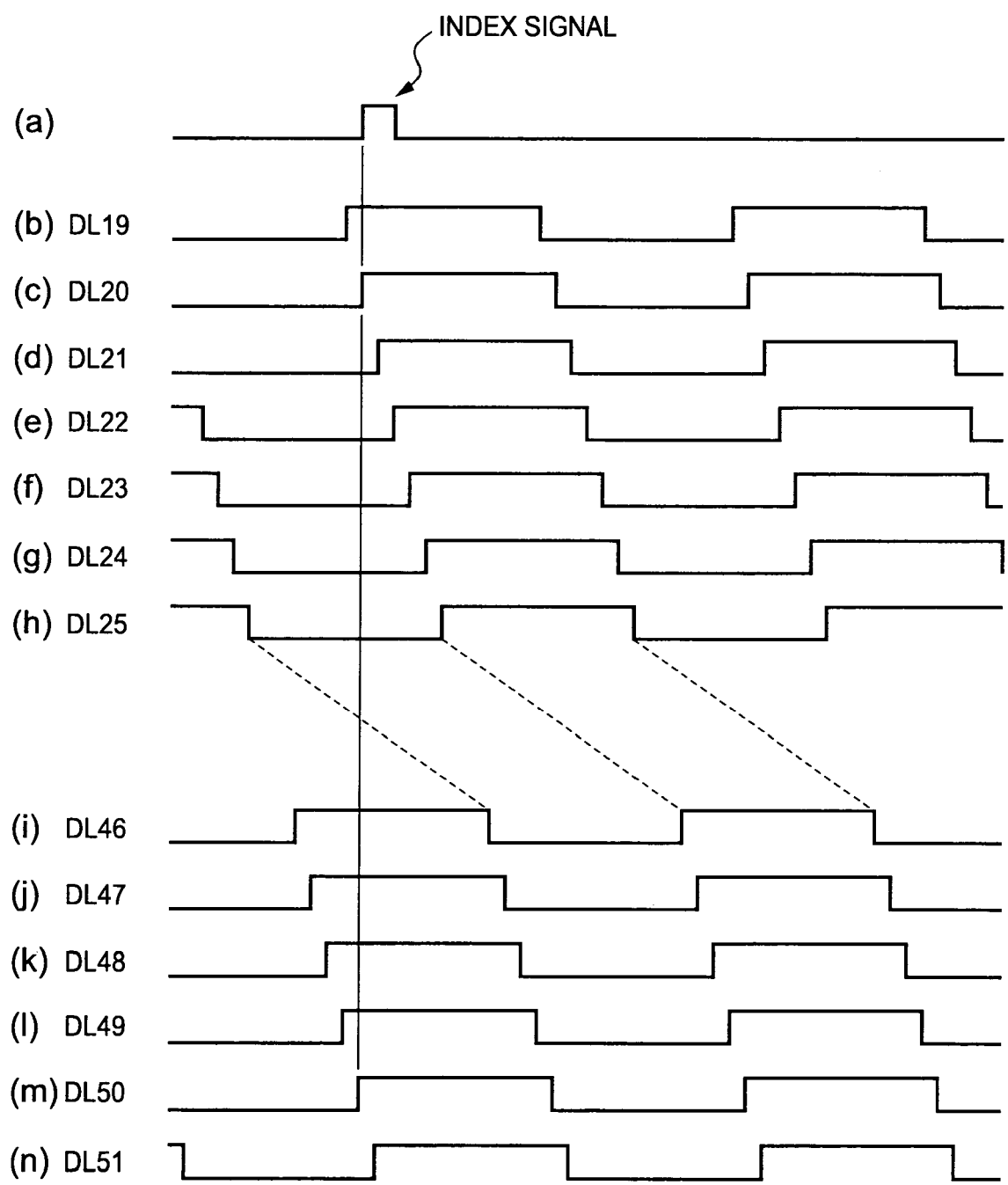
FIG. 5 is a timing chart for explaining the operation state of the image printing apparatus according to the first embodiment of the present invention.

Assume that SP1=20 and SP2=50. FIG. 5 shows this state. In this case, 20th DL 20 ((c) in FIG. 5) and 50th DL 50 ((m) in FIG. 5) lagging behind DL 20 by one clock period are synchronized with the leading edge of the index signal ((a) in FIG. 5).

The synchronization count NS is then obtained from the first synchronization point information SP1 and second synchronization point information SP2. In this case, the synchronization count NS indicates a specific number of delay elements to which a time of one fundamental clock period corresponds in terms of delay time. In the first embodiment, NS=30 according to synchronization count NS=SP2−SP1.

A delay time DT of per delay element is obtained from NS and the fundamental clock period. Assume that a fundamental clock period TC is 30 ns. In this case, since NS=30, DT=1 ns according to DT=TC/NS. The delay time per delay element varies due to variations in the temperature of an integrated circuit, the power supply voltage applied to the integrated circuit, and the like, and hence may become 1.5 ns in some case and 0.5 ns in another case. However, since the fundamental clock period TC is constant, the delay time per delay element at the time of measurement can be accurately obtained by obtaining the synchronization count NS.

The correction count value CC indicating how many delay elements by which a shift should be finally made to obtain a proper image signal is obtained from the offset information ER, offset direction information, and delay time DT. In this case, ER=6 ns, offset direction information="−correction", and DT=1 ns. Therefore, correction count value CC=−6.

According to the above correction count value CC, in order to obtain a proper image signal, the delay element count may be finally advanced by six. That is, a signal from the 50th delay element is used in synchronism with the leading edge of an index signal, and signals from the 49th, 48th, 47th, 46th, and 45th delay elements are sequentially interchanged and used in synchronism with a select signal. Finally, a signal from the 44th delay element is used.

If the correction amount is larger than the synchronization count, a select signal may be circulated. In a case of "−correction" with SP1=20, SP2=50, and synchronization count=30, when a select signal is set to 50, 49, ..., 21, and 20, since 20 of the select signal is in phase with 50 of the select signal, the select signal is set next to 49, 48, .... That is, the select signal is set to 50, 49, ..., 21, 20 (=50), 49, 48, .... In a case of "+ correction" as well, a select signal may be circulated in the same manner.

When "− correction" is to be made in steps of three like 50, 47, 43, ..., 23, 19, SP1=20 will be exceeded. However, 50−(20−19)−3=46 is set next to 19. That is, the select signal can be circulated without any problem while an excess over the synchronization point and one correction amount are added together.

Upon reception of such a select signal, the selecting section 216 selects the 50th signal, 49th signal, 48th signal, 47th signal, ... from a delay signal group (in FIG. 1) from the delay chain section 213, and outputs them as dot clocks ((g) in FIG. 4).

When the 50th signal, 49th signal, 48th signal, 47th signal, ... are selected from the delay signal group (in FIG. 1), a delay signal synchronized with an index signal is obtained first. Subsequently, delay signals which gradually decrease in delay (advancing in phase) are obtained. As a result, "−correction" is realized to make correction to contract an offset as image expansion in the main scanning direction.

In a case of "+correction", by selecting the 20th signal, 21st signal, 22nd signal, 23rd signal, ... from the delay signal group (in FIG. 1), with the first synchronization point information SP1 being set as an initial value, a delay signal synchronized with an index signal is obtained first. Subsequently, delay signals which gradually decrease in delay (lagging in phase) are obtained. As a result, "+correction" is realized to make correction to expand an offset as image contraction in the main scanning direction.

That is, adjustment can be made to set the pulse count to a predetermined count by shifting the pulse of a fundamental clock at given time intervals and to set the time during which the predetermined number of pulses are generated to a predetermined time.

Since the above correction is controlled on the basis of the offset information ER (frequency offset information), an accurate adjustment is made for a length in the main scanning direction, and a halfway offset can be suppressed.

Figure 6:
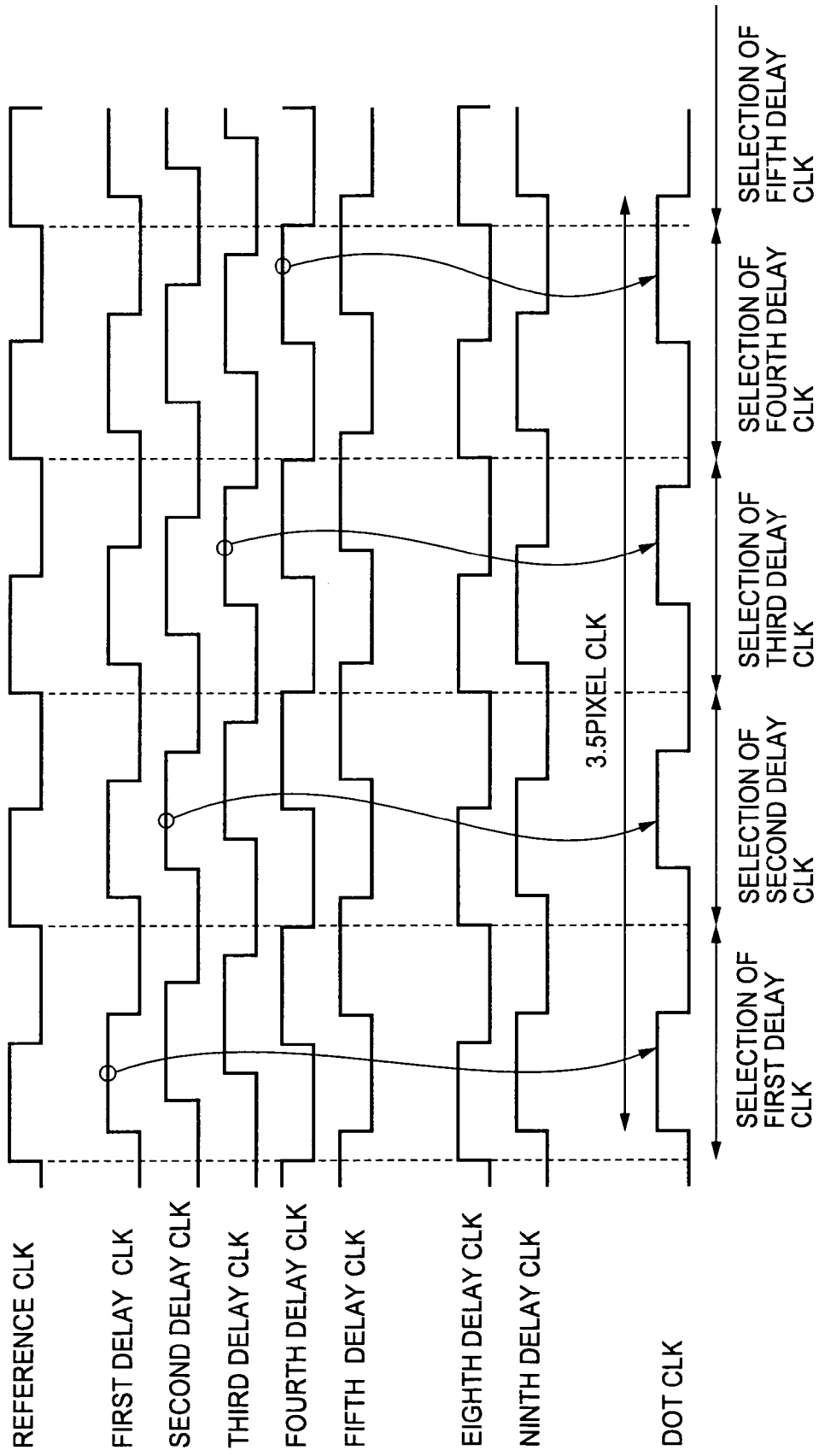
FIG. 6 is a timing chart for explaining the operation state of the image printing apparatus according to the first embodiment of the present invention.

FIG. 6 schematically shows how the above correction of expansion/contraction in the main scanning direction (i.e., main-scanning magnification correction) is made. FIG. 6 shows a fundamental clock, delay signals (first to ninth delay clocks), and a dot clock.

In the case shown in FIG. 6, by selecting the first delay clock, second delay clock, third delay clock, fourth delay clock, fifth delay clock, ... during four fundamental clock periods, 3.5 dot clocks are set during four periods. That is, 3.5/4=87.5%, and hence control is performed to decrease the frequency in a pseudo manner. Note that the same result can be obtained by executing another selection method.

In the case shown in FIG. 6, since the eighth delay clock is in phase with the fundamental clock, when the eighth delay clock, seventh delay clock, sixth delay clock, fifth delay clock, fourth delay clock, ... are selected during four fundamental clock periods, 4.5 dot clocks (not shown) are set during four periods. That is, 4.5/4=112.5%, and hence control is performed to increase the frequency in a pseudo manner. Note that the same result can be obtained by executing another selection method.

In this case, a specific manner of adjusting a dot clock in this embodiment will be schematically shown and described. FIGS. 13A to 13E show a case wherein test patterns are printed at four different positions in the main scanning direction (to in FIG. 13A).

Figure 13A:
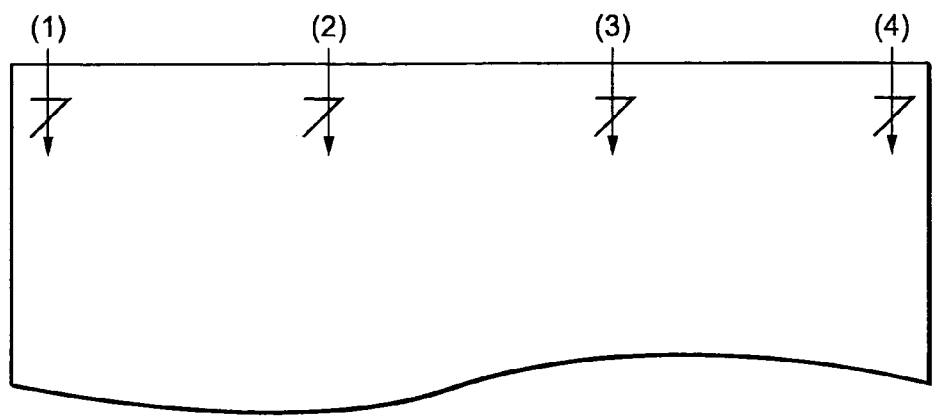
FIGS. 13A to 13E are schematic views for explaining an example of dot clock adjustment in the present invention.
Figure 13B:

Assume that a halfway offset is detected by the halfway offset sensor 270a by the test patterns in this state, as shown in FIG. 13B.

Assume that no halfway offset has occurred at the position of in FIG. 13A, a halfway offset has occurred at the position of (2) in FIG. 13A (in a direction toward the left side of the drawing surface and in which the interval between (1) and (2) decreases in FIG. 13A), no halfway offset has occurred at the position (3) in FIG. 13A, and no halfway offset has occurred at the position (4) in FIG. 13A.

In this case, the interval between (1) and (2) has decreased. Since no halfway offset has occurred at (3), the interval between (2) and (3) has increased. In addition, since no halfway offset has occurred at (4), the length in the main scanning direction is assumed to be a predetermined length.

When the above halfway offset has occurred, the CPU 201 performs control to increase the interval between dot clocks between (1) and (2) by the above "+correction". Likewise, the CPU 201 performs control to decrease the interval between dot clocks between (2) and (3) by the above "−correction". Since no change in interval has occurred between (3) and (4), no correction is performed. With the above operation, the halfway offset can be eliminated, and a state wherein there is no change in length in the main scanning direction can be obtained.

Figure 13C:
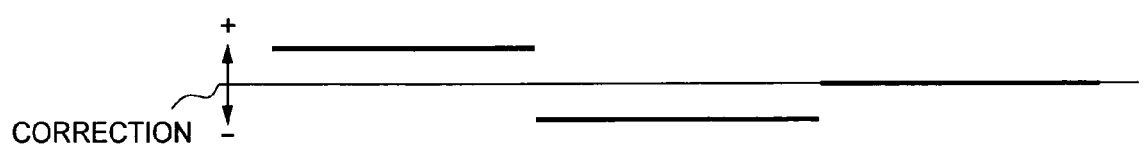
Figure 13D:
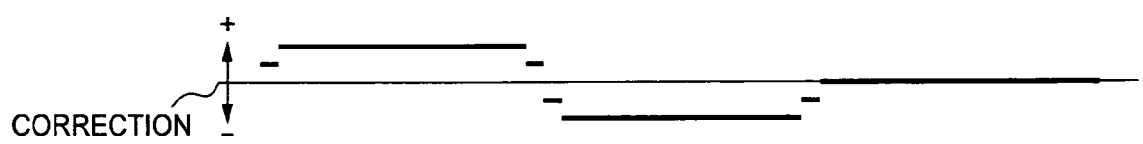
Figure 13E:

As shown in FIG. 13C, "+correction" and "−correction" may be performed stepwise. In addition, as shown in FIG. 13D, "+correction" and "−correction" are preferably performed more finely and smoothly if possible in terms of correction step.

Note that FIGS. 13A to 13E show an example of a halfway offset, which can be eliminated to make the main-scanning length constant by applying this embodiment and performing proper correction in accordance with the halfway offset.

The use of the digital delay type dot clock adjusting section in the above manner can adjust an offset between the start and the end in the main scanning direction. A halfway offset can be suppressed by adjusting the timing of a dot clock at three or more positions in the main scanning direction using pieces of error information at three or more positions on one surface of an image recording sheet in the main scanning direction. In the field of offset printing or the like, in particular, not only expansion/contraction between the start and the end but also a pixel offset caused at a halfway point (halfway offset) may pose a serious problem. However, satisfactory offset correction can be performed by this embodiment of the present invention.

The above specific example has exemplified the case of the test patterns at the three positions. However, increasing the number of test patterns will suppress halfway offsets more finely. If, for example, test patterns are printed at four positions, halfway offset suppression can be done in areas on the left end portion/near the center/on the right end portion. That is, offset correction can be done at three positions by using test patterns at four positions, thereby obtaining a better result.

The first embodiment uses the digital circuit arrangement having no analog feedback circuit such as a PLL. This circuit and other digital circuit portions can therefore be integrated into one chip. This makes it possible to perform halfway offset elimination with higher precision.

Letting L be the number of pixels per line in the main scanning direction, which are used for image printing L1 to Ln−1 be the numbers of pixels in the respective ranges divided by n test patterns (n is equal to or more than 3), and N1 to Nn−1 be the offset amounts calculated between the three or more test patterns, it is preferable that an offset correction amount Nj/Lj (where 1 j n) between each pair of test patterns be evenly distributed to the respective pixels between each pair of test patterns so as to be reflected in the selection of a delay count for a dot clock.

In this manner, error information is detected at three or more positions in the main scanning direction and is evenly distributed to the respective pixels between each pair of test patterns so as to be reflected in the selection of a delay count for a dot clock. This can align the starts and the ends of the respective lines and properly suppress a halfway offset as a pixel offset in a halfway portion.

In the first embodiment, the CPU 201 is externally provided for the dot clock adjusting section 210. However, the dot clock adjusting section 210 may incorporate controllers such as the CPU 201 and various kinds of tables.

As described above in detail, according to the first embodiment, when a dot clock as the basis of each pixel forming an image is generated and exposure of each pixel is to be performed on one surface of an image recording sheet on the basis of the dot clock, a plurality of delay clocks are generated by finely delaying a fundamental clock, and the manner of selection for the plurality of delay clocks is changed to change the leading edge timing or trailing edge timing of the dot clock generated for a surface on which an offset should be adjusted. In this state, test patterns are printed at three or more positions on an image printing surface in the main scanning direction to detect error information associated with an offset on one surface, and the manner of selection of a plurality of delay clocks is controlled in accordance with the error information, thereby correcting an offset on one surface.

Since this embodiment uses the digital circuit arrangement having no analog feedback circuit such as a PLL, the circuit and other digital circuit portions can be integrated into one chip. This makes it possible to perform halfway offset elimination with higher precision.

In addition, in the first embodiment, offset correction is executed upon detection of error information at three or more positions in the main scanning direction. This can align the starts and the ends of the respective lines in the main scanning direction and adjust a halfway offset as a pixel offset in a halfway portion between the start and the end of each line.

In the first embodiment, the offset detecting section, digital delay type dot clock adjusting device, and controller can be formed from digital circuits. These sections can perform halfway offset elimination with high precision in a state wherein they are suitable for integration into one chip.

The first embodiment described above is directed to halfway offset correction. If, however, a pattern in the form of the Katakana character "フ" to be printed on the start side in the main scanning direction is placed as near the end portion at the start position in the main scanning direction as possible, and image leading end offset information associated with the start position of an image in the main scanning direction is supplied to the selection control section 215 in the writing unit circuit section 200, the start positions of the respective lines in the main scanning direction can be aligned.

According to the above description of the first embodiment, a halfway offset is detected by the halfway offset sensor 270a, and an offset is set. In addition to this operation, the CPU 201 may analyze the image data obtained by making a scanner (not shown) read an image recording sheet on which test patterns are printed, and set an offset. Alternatively, an operator may measure an image recording sheet on which test patterns are printed, and set an offset obtained from the measurement result with respect to the CPU 201 with an operating section (not shown).

Second Embodiment

The second embodiment of the present invention will be described in detail below with reference to the accompanying drawings. Note that the image printing apparatus shown in FIGS. 14 and 7 is assumed to be a specific example of an image printing apparatus according to the second embodiment. That is, the image printing apparatus according to the second embodiment is an image printing apparatus capable of printing images on the two surfaces of an image recording sheet. Note that this apparatus may either be a monochrome image printing apparatus or color image printing apparatus.

The image printing apparatus according to the second embodiment of the present invention will be described in detail below.

Figure 8:
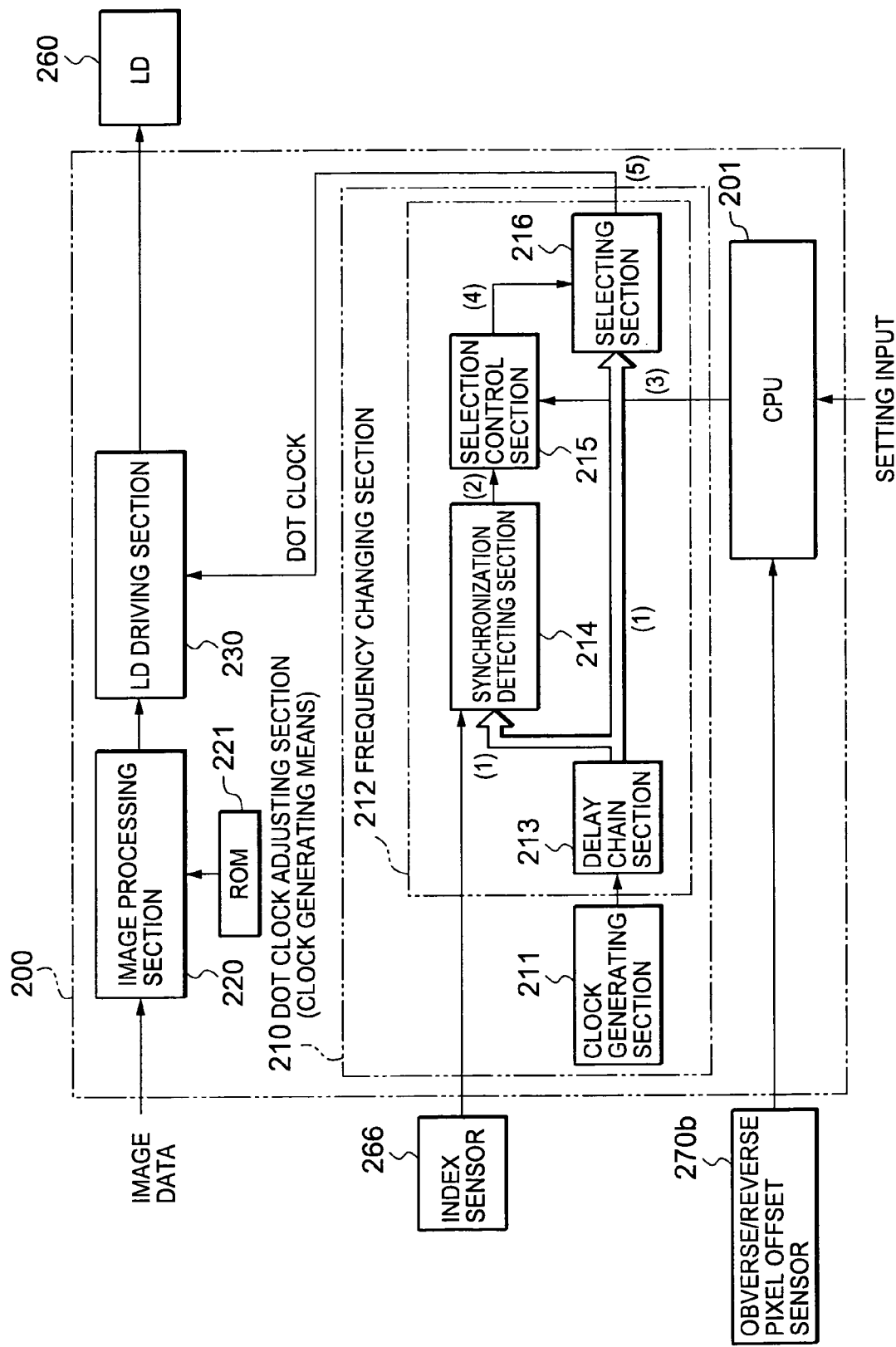
FIG. 8 is a sectional view showing the arrangement of a writing section of an image printing apparatus according to the second embodiment of the present invention.

FIG. 8 shows a writing unit circuit section 200, an LD 260 for performing exposure, an index sensor 266, and an obverse/reverse pixel offset sensor 270b.

The writing unit circuit section 200 of a writing unit 20 forms an electrostatic latent image by scanning a laser beam on the surface of a photosensitive drum 10 (see FIG. 7) in accordance with image data.

Referring to FIG. 8, the writing unit circuit section 200 includes a CPU 201 serving as a controller for controlling the overall image printing apparatus, a dot clock adjusting section 210 which is a characteristic feature of the second embodiment, an image processing section 220 for performing image processing, and an LD driving section 230 for generating an LD driving signal in accordance with a dot clock based on the image processing result.

Assume that the obverse/reverse pixel offset sensor 270b is placed downstream of a fixing unit 70 to detect pixel offsets at three or more positions in the main scanning direction and read predetermined patterns after fixing.

In this case, the predetermined pattern means a test image printed in accordance with test image data stored in advance.

The arrangement and operation of the dot clock adjusting section 210 will be sequentially described below. Not that the dot clock adjusting section 210 is a clock generating section in the claims. The dot clock adjusting section 210 is comprised of a clock generating section 211 for generating a fundamental clock and a frequency changing section 212 capable of changing the frequency of the fundamental clock generated by the clock generating section 211. In this case, the frequency changing section 212 changes the leading or trailing edge timing or frequency of a dot clock to a desired timing such as a given timing during scanning of one line or a timing corresponding to each image printing surface or image printing color in order to change the position of a pixel printed in accordance with the dot clock. In this embodiment, the frequency changing section 212 is formed from a digital delay type dot clock adjusting device, and is comprised of (A), (B), (C), and (D) described below.

(A) Delay Signal Generation:

A delay chain section 213 is a delay element group for obtaining a plurality of delay signals (delay signal group: in FIG. 8) having slightly different phases from each other by delaying an input signal (the fundamental clock from the clock generating section 211).

In this case, in the delay chain section 213, delay elements are preferably cascaded in the form of a chain to connect a sufficient number of delay elements to generate delay signals having slightly different phases from each other over two fundamental clock periods.

Although the clock generating section 211 may be incorporated in each of clock generating circuits for the respective colors, i.e., Y, M, C, and K in a case of a color image printing apparatus, fundamental clocks may be distributed from the single clock generating section 211 to the clock generating circuits for the respective colors.

As has already been shown in FIG. 14, the index sensor 266 detects an exposure timing at a reference position in scanning of a laser beam, and generates an index signal indicating the timing.

(B) Synchronization Detection:

A synchronization detecting section 214 is a detecting section which receives the index signal generated by the index sensor 266 and detects the ordinal number of a delay signal (synchronization point), of a delay signal group (in FIG. 8), which is synchronized with the index signal. This section outputs synchronization point information (in FIG. 8).

In this case, the synchronization detecting section 214 preferably outputs first synchronization point information SP1 indicating a delay signal, of the delay signal group (in FIG. 8), which is synchronized first with the index signal, and second synchronization point information SP2 indicating a delay signal synchronized next with the index signal.

Since a plurality of delay signals from the delay chain section 213 may greatly vary in delay time due to the influences of temperature changes and the like, how many delay signals are included in a predetermined unchanging time (the time interval between an index signal and another index signal) is detected in advance in this manner. This makes it possible to calculate back the delay time per delay signal of a delay signal group.

(C) Selection Control:

A selection control section 215 obtains a synchronization correction amount on the basis of synchronization point information (in FIG. 8) from the synchronization detecting section 214 and frequency offset information (in FIG. 8) from the CPU 201, and outputs a select signal (in FIG. 8) indicating a delay signal having a specific phase which is to be selected from a delay signal group (in FIG. 8). The frequency offset information will be described later.

(D) Selection:

A selecting section 216 receives a select signal in FIG. 8) from the selection control section 215, and selects a delay signal having a corresponding phase from a delay signal group (in FIG. 8). The selecting section 216 then generates a rectangular wave by setting the selected delay signal as leading and trailing edges, and outputs the rectangular wave as a dot clock (in FIG. 8).

In this manner, the period of a dot clock is slightly increased or decreased by setting a delay signal having a selected timing as leading and trailing edges in generating a dot clock. This can realize (a) and (b) described below.

(a) Generating a signal having a predetermined number of pulses generated in a predetermined period of time makes the length of each line in the main scanning direction uniform and makes the length between the start and the end of each line constant.

(b) The timing of a dot clock is adjusted at three or more positions in the main scanning direction by using pieces of error information at the three or more positions in the main scanning direction, thereby suppressing a halfway offset.

Not only (a) but also (b), which is unfeasible in the prior art, can be realized by sequentially selecting delay signals, whose phases (the positions or timings of the pulses of a dot clock) are finely and gradually changed, within a predetermined period of time without changing the clock frequency itself instead of making adjustment by finely adjusting the oscillation frequency of a fundamental clock oscillated and generated by the clock generating section 211.

<Principle (2) of Offset Detection for Dot Clock Adjustment>

The manner of offset detection in the first embodiment will be briefly described below with reference to the flow chart of FIG. 9 and the schematic view of FIG. 3. At the time of offset detection, the writing unit circuit section 200 generates images with predetermined patterns stored in a ROM 221 at a total of three or more positions, i.e., the start position, end position, and intermediate position on the photosensitive drum 10 in the main scanning direction (S1 in FIG. 9). FIG. 3 shows a case wherein patterns in the form of the Katakana character "ク" are printed as predetermined patterns at three positions in the main scanning direction.

Assume that although the patterns indicated by the solid lines are actually printed on the image recording sheet, the patterns indicated by the broken lines were expected to be printed. In this case, offsets dx1, dx2, and dx3 have occurred with respect to the respective patterns in the main scanning direction due to the aberrations of the writing unit and the respective optical systems, contraction due to fixing, and the like.

When these patterns are read by the obverse/reverse pixel offset sensor 270b disposed at a position where it can read the patterns on the image recording sheet having passed through the fixing unit 70 (S2 in FIG. 9), a distance Y1' from the horizontal line to the oblique line of the pattern in the form of the Katakana character "ク" includes an offset dy1, and distances Y2' and Y3' respectively include offsets dy2 and dy3.

Letting è be the angle defined by the horizontal and oblique lines, dx1=dy1/tanè. In addition, the offset dy1 can also be obtained from the moving speed of the image carrier in the sub-scanning direction and the difference between the times when the horizontal and oblique lines are read.

Likewise, letting è be the angle defined by the horizontal and oblique lines, dx2=dy2/tanè. Furthermore, the offset dy2 can be obtained from the moving speed of the image carrier in the sub-scanning direction and the difference between times when the horizontal and oblique line are read.

Likewise, letting è be the angle defined by the horizontal and oblique lines, dx3=dy3/tanè. Furthermore, the offset dy3 can be obtained from the moving speed of the image carrier in the sub-scanning direction and the difference between times when the horizontal and oblique line are read.

Figure 9:
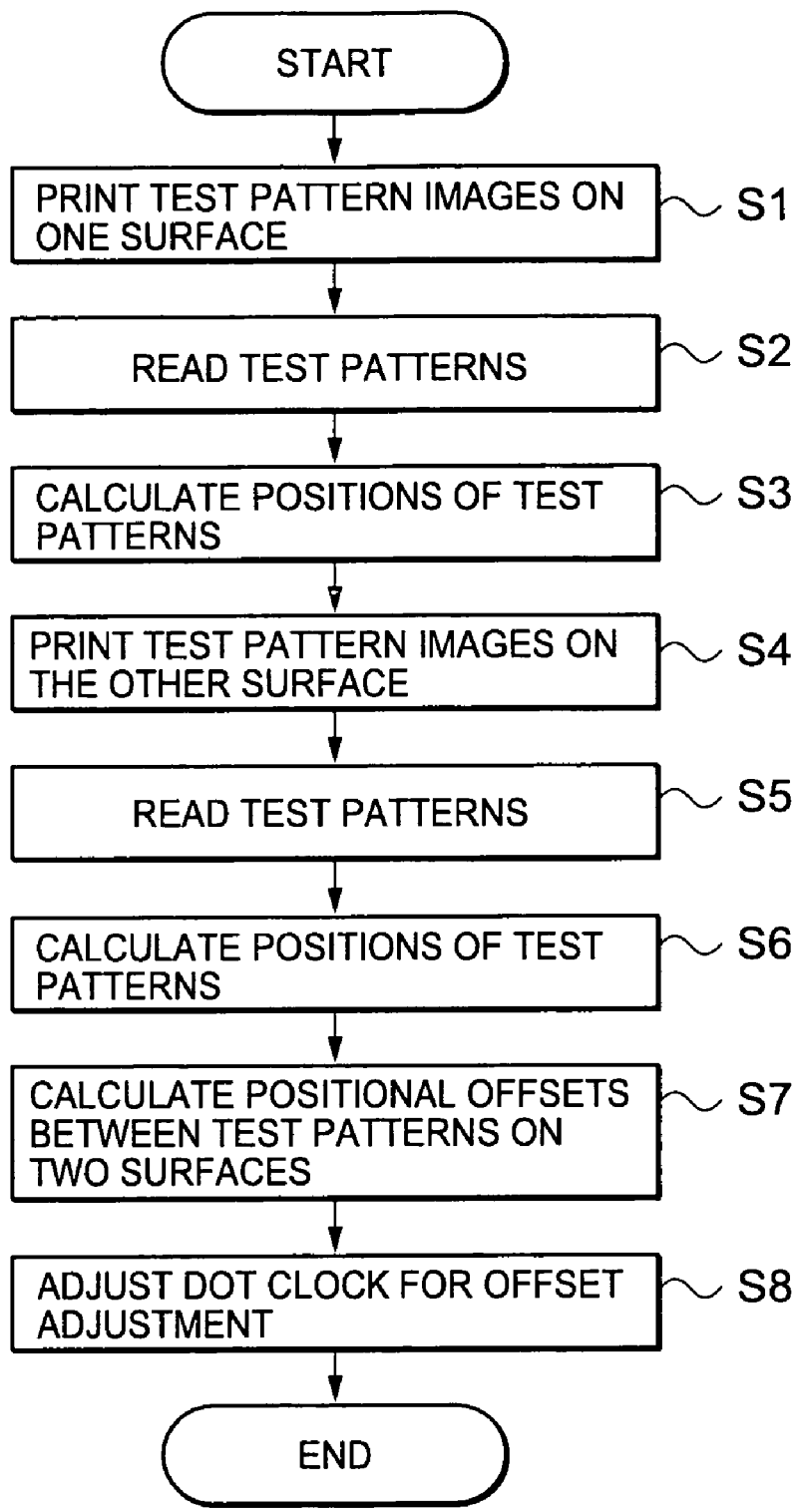
FIG. 9 is a flow chart for explaining the operation of the image printing apparatus according to the second embodiment of the present invention.

In the above manner, the positions of the test patterns (offset states) are calculated by the CPU 201 (S3 in FIG. 9).

The image recording sheet whose test patterns printed on one surface are read is caused to pass along a reversal convey path to also print test patterns on the other surface in the same manner (S4 in FIG. 9). The obverse/reverse pixel offset sensor 270*b* reads the test patterns (S5 in FIG. 9). The positions of the test patters (offset states) are then calculated (S6 in FIG. 9).

The CPU 201 calculates pixel offset states on the two surfaces by comparing the positions (offset states) of the test patterns on the respective surfaces (S7 in FIG. 9).

Note that the CPU 201 may calculate pixel offset states on the respective surfaces by comparing the positions (offset states) of the test patterns on the respective surfaces with the reference distances based on the test patterns.

Therefore, by printing and reading such predetermined patterns on the two surfaces of an image recording sheet at the same position in the sub-scanning direction and three or more positions in the main scanning direction, the CPU 201 can detect offset states (frequency offset information) associated with the expansion/contraction of an image and pixel offsets in the main scanning direction.

The CPU 201 performs the above detection processing with respect to the two surfaces of the image recording sheet in this manner, and supplies frequency offset information (in FIG. 8) to the selection control section 215 of the writing unit circuit section 200.

Likewise, the CPU 201 can obtain image leading end offset information associated with the start position of an image in the main scanning direction by detecting the pattern in the form of the Katakana character "ア" on the start end side in the main scanning direction, and can supply the image leading end offset information to the selection control section 215 in the writing unit circuit section 200.

In the above manner, in usual image printing operation, on the basis of frequency offset information representing pixel offset states on the two surfaces, the dot clock adjusting section 210 generates dot clocks for eliminating the pixel offset states on the two surfaces of the image recording sheet, thereby printing an image (S8 in FIG. 9)

By executing the above correction in the same manner as in the first embodiment which has been described with reference to FIGS. 4 to 6, control is done on the basis of offset information ER (frequency offset information), the length in the main scanning direction is accurately adjusted, and an obverse/reverse pixel offset is suppressed.

In this case, proper correction can be made for an obverse/reverse pixel offset and the length in the main scanning direction by performing control based on the characteristics shown in FIGS. 13A to 13E in accordance with the obverse/reverse pixel offset that has currently occurred.

The use of the digital delay type dot clock adjusting section in the above manner can adjust an offset between the start and the end in the main scanning direction. An obverse/reverse pixel offset can be suppressed by adjusting the timing of a dot clock at three or more positions in the main scanning direction using pieces of error information at three or more positions on each of the obverse and reverse surfaces of an image recording sheet in the main scanning direction.

The above specific example has exemplified the case of the test patterns at the three positions. However, increasing the number of test patterns will suppress obverse/reverse pixel offsets more finely. If, for example, test patterns are printed at four positions, obverse/reverse pixel offset suppression can be done in areas on the left end portion/near the center/on the right end portion. That is, offset correction can be done at three positions by using test patterns at four positions, thereby obtaining a better result.

The second embodiment uses the digital circuit arrangement having no analog feedback circuit such as a PLL. This circuit and other digital circuit portions can therefore be integrated into one chip. This makes it possible to perform obverse/reverse pixel offset elimination with higher precision.

Letting L be the number of pixels per line in the main scanning direction which are used for image printing, L1 to Ln−1 be the numbers of pixels in the respective ranges divided by n test patterns (n is equal to or more than 3), and N1 to Nn−1 be the offset amounts calculated between the three or more test patterns, it is preferable that an offset correction amount Nj/Lj (where 1 j n) between each pair of test patterns be evenly distributed to the respective pixels between each pair of test patterns so as to be reflected in the selection of a delay count for a dot clock.

In this manner, error information is detected at three or more positions in the main scanning direction and is evenly distributed to the respective pixels between each pair of test patterns so as to be reflected in the selection of a delay count for a dot clock. This can align the starts and the ends of the respective lines and properly perform pixel offset adjustment in a halfway portion.

In the second embodiment described above, the CPU 201 is externally provided for the dot clock adjusting section 210. However, the dot clock adjusting section 210 may incorporate controllers such as the CPU 201 and various kinds of tables.

As described above in detail above, according to the second embodiment, when a dot clock as the basis of each pixel forming an image is generated and exposure of each pixel is to be performed on the two surfaces of an image recording sheet on the basis of the dot clock, a plurality of delay clocks are generated by finely delaying a fundamental clock, and the manner of selection for the plurality of delay clocks is changed to change the leading edge timing or trailing edge timing of the dot clock generated for a surface on which an offset should be adjusted. In this state, test patterns are printed at three or more positions on each surface in the main scanning direction to detect error information associated with an offset on each surface, and the manner of selection of a plurality of delay clocks is controlled in accordance with the error information, thereby correcting an offset on one surface.

Since this embodiment uses the digital circuit arrangement having no analog feedback circuit such as a PLL, the circuit and other digital circuit portions can be integrated into one chip. This makes it possible to perform halfway offset elimination with higher precision.

In addition, in the second embodiment, offset correction is executed upon detection of error information at three or more positions in the main scanning direction. This can align the starts and the ends of the respective lines in the main scanning direction and adjust an obverse/reverse pixel offset as a pixel offset in a halfway portion between the start and the end of each line.

The second embodiment has the digital delay type dot clock adjusting device as a circuit common to the respective surfaces on which offsets should be adjusted. This makes it possible to reduce the circuit size while eliminating an obverse/reverse pixel offset with high precision.

In the second embodiment, the digital delay type dot clock adjusting device and controller can be formed from digital circuits. These sections can perform obverse/reverse pixel offset elimination with high precision in a state wherein they are suitable for integration into one chip.

In the second embodiment, since the apparatus operates under the control of a controller such as a CPU externally provided for the digital delay type dot clock adjusting device, an obverse/reverse pixel offset can be eliminated with high precision.

In the second embodiment, since the apparatus operates under the control of a controller such as a CPU incorporated in the digital delay type dot clock adjusting device, obverse/reverse pixel offset elimination can be done with high precision in a state wherein the device is suitable for integration into one chip.

The second embodiment described above is directed to obverse/reverse pixel offset correction. If, however, a pattern in the form of the Katakana character "フ" to be printed on the start side in the main scanning direction is placed as near the end portion at the start position in the main scanning direction as possible, and image leading end offset information associated with the start position of an image in the main scanning direction is supplied to the selection control section 215 in the writing unit circuit section 200, the start positions of the respective lines in the main scanning direction can be aligned.

According to the above description of the second embodiment, an obverse/reverse pixel offset is detected by the obverse/reverse pixel offset sensor 270b, and an offset is set. In addition to this operation, the CPU 201 may analyze the image data obtained by making a scanner (not shown) read an image recording sheet on which test patterns are printed, and set an offset. Alternatively, an operator may measure an image recording sheet on which test patterns are printed, and set an offset obtained from the measurement result with respect to the CPU 201 with an operating section (not shown).

Third Embodiment

The third embodiment of the present invention will be described below. The third embodiment is directed to a color image printing apparatus having an exposure unit (see FIG. 14) for each of a plurality of colors to print an image in a plurality of colors.

This color image printing apparatus scans a laser beam modulated in accordance with image data in the main scanning direction for each color, and forms an image in each color on an image carrier for each color which rotates in the sub-scanning direction. In this case, the laser beam is modulated with the image data with reference to a pixel clock called a dot clock.

Figure 10:
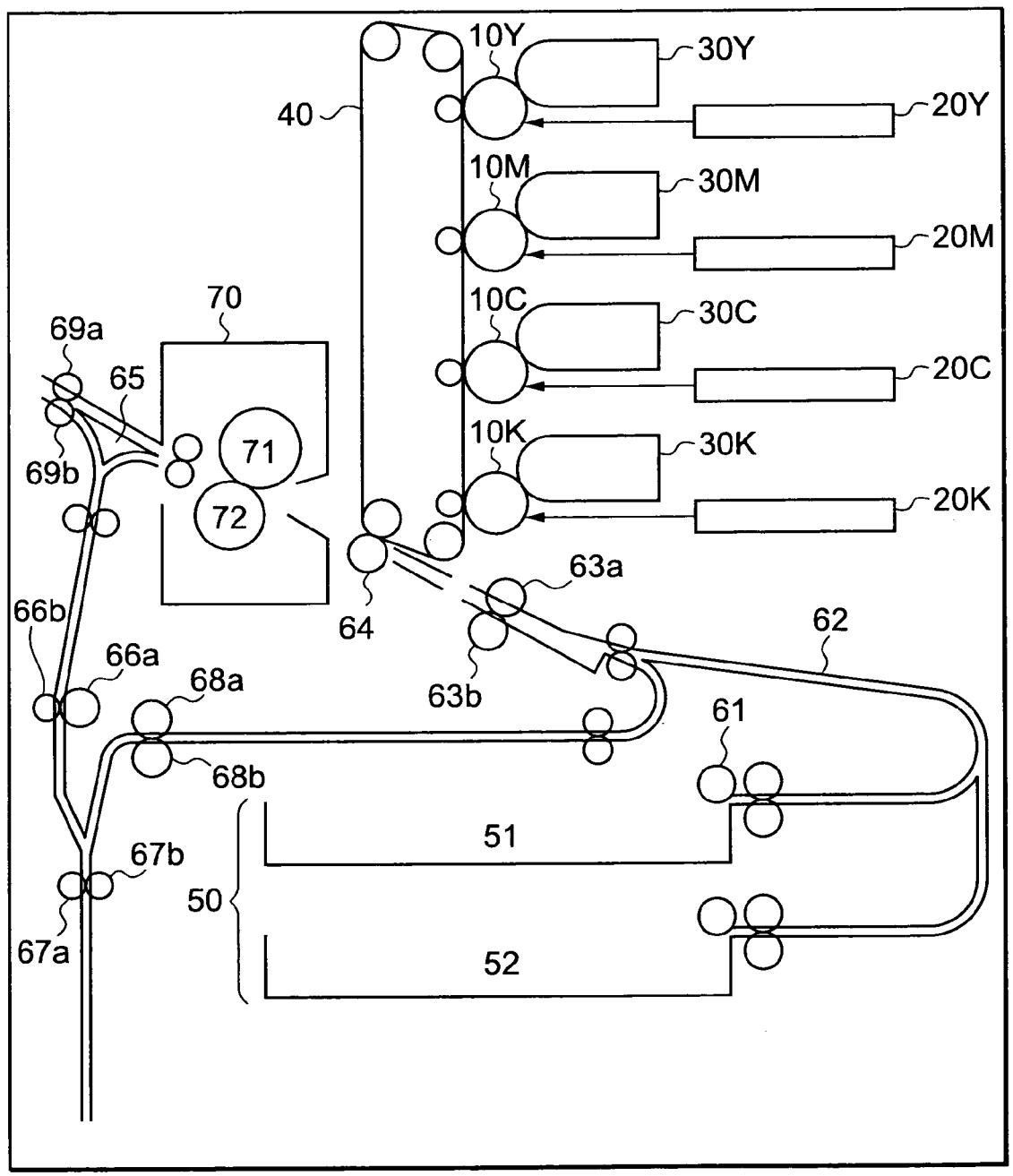
FIG. 10 is a sectional view showing the arrangement of a writing section of an image printing apparatus according to the third embodiment of the present invention.

FIG. 10 is a sectional view showing the arrangement of the print engine of the image printing apparatus according to the third embodiment.

FIG. 10 shows a specific example of the image printing apparatus which can print a color image by using toners of a plurality of colors. In this apparatus, toner image from the image carriers of the respective colors are primarily transferred to the intermediate transfer member and superimposed thereon. An image recording sheet is then clamped between the intermediate transfer member and the transfer roller to secondarily transfer the image from the intermediate transfer member to the image recording sheet, thereby printing the image.

Reference numeral 10Y to 10K denote photosensitive drums serving as image carriers on which Y (Yellow), M (Magenta), C (Cyan), and K (blacK) toner images are formed.

Reference numerals 20Y to 20K denote writing units for forming electrostatic latent images on the surfaces of the photosensitive drums 10Y to 10K by scanning laser beams in accordance with pieces of image information of the respective colors.

Reference numerals 30Y to 30K denote developing devices for forming toner images by developing the electrostatic latent images formed on the surfaces of the photosensitive drums 10Y to 10K with developers (toners) o the respective colors.

Reference numeral 40 denotes an intermediate transfer member belt on which the toner images from the photosensitive drums 10Y to 10K of the respective colors are transferred (primarily transferred) and superimposed; and 64, a secondary transfer roller for transferring (secondarily transferring) the toner image from the intermediate transfer member belt 40 onto an image recording sheet, and separating the image recording sheet from the intermediate transfer member belt 40. Note that an illustration of a belt cleaning section and the like is omitted.

Reference numeral 50 denotes a paper feed section in which image recording sheets are stored. FIG. 10 shows paper feed cassettes 51 and 52 of the paper feed section 50. Note that the number of paper feed cassettes is not limited to this.

Reference numerals 61 to 68 denote convey devices such as convey rollers and path switching device. Reference numeral 61 denotes a feed roller for feeding an image recording sheet from a paper feed cassette; 62, a convey path along which an image recording sheet from the paper feed section 50 (51 or 52) travels; 63a and 63b, registration rollers for feeding an image recording sheet at the timing of image printing; 64, a secondary transfer roller; 65, a path switching device which switches between delivery and circulation of an image recording sheet; 66a, 66b, 67a, 67b, 68a, and 68b, inversion rollers for inverting the obverse and reverse surfaces of an image recording sheet; and 69a and 69b, delivery rollers for delivering an image recording sheet outside the apparatus.

Reference numeral 70 denotes a fixing unit for fixing a toner image on an image recording sheet with heat and pressure. The fixing unit 70 has a heat roller 71 (or 72) and a pressure roller 72 (or 71).

The arrangement of a writing unit using a laser beam in this manner is the same as that shown in FIG. 14 which has already been described in the first embodiment. In this case, the writing units 20Y, 20M, 20C, and 20K also have the same arrangement.

The image printing apparatus according to the third embodiment will be described in detail below with reference to the accompanying drawings. That is, the image printing apparatus according to the third embodiment is an image printing apparatus capable of printing images in a plurality of colors, i.e., at least two colors. This embodiment will exemplify a color image printing apparatus using toners of four colors, i.e., Y (Yellow), M (Magenta), C (Cyan), and K (blacK).

Figure 11:
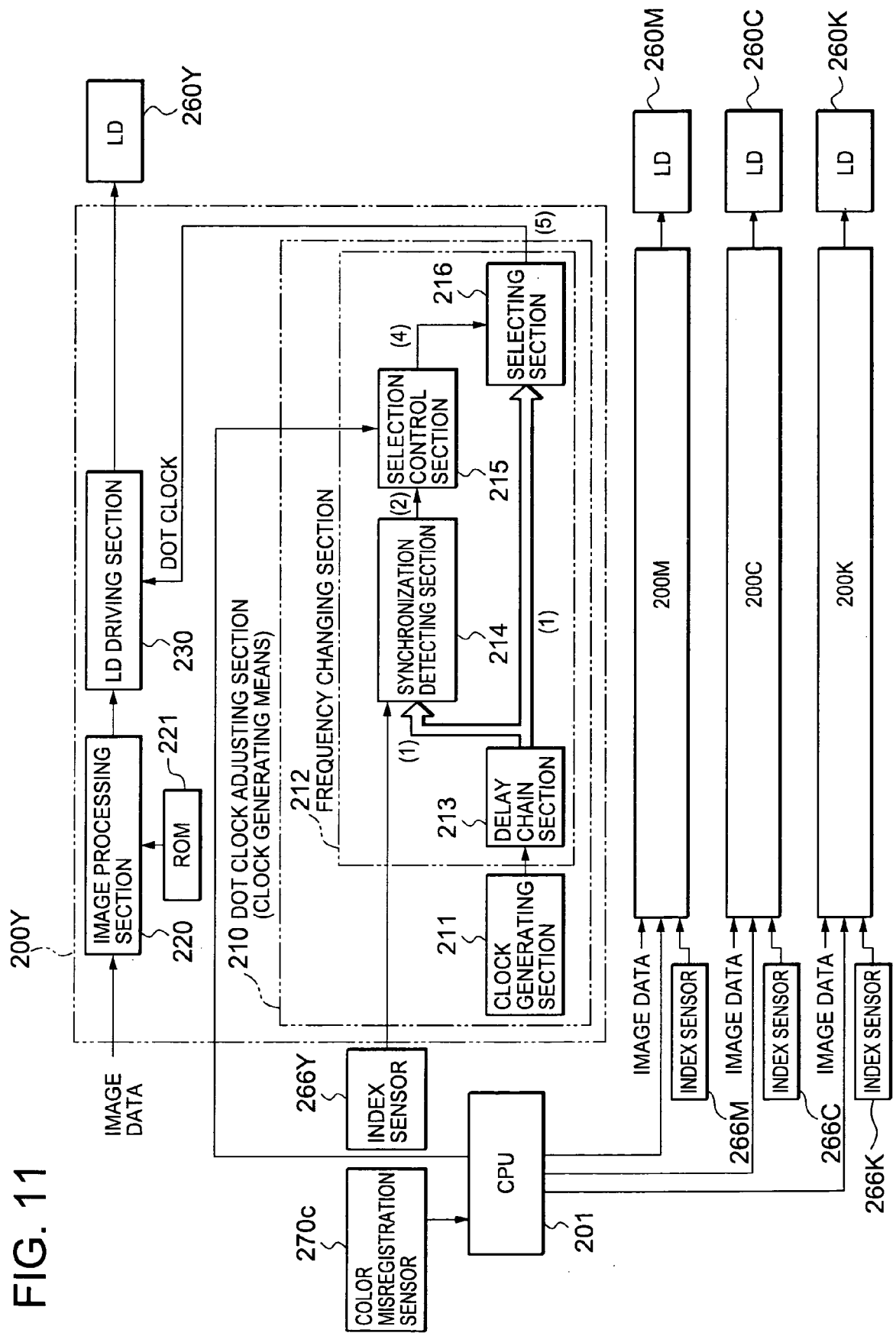
FIG. 11 is a block diagram showing the electrical arrangement of the main part of the image printing apparatus according to the third embodiment of the present invention.

FIG. 11 shows a CPU 201 serving as a controller for controlling the overall image printing apparatus, a writing unit circuit section 200Y for Y, a writing unit circuit section 200M for M, a writing unit circuit section 200C for C, a writing unit circuit section 200K for K, an LD 260Y for performing exposure for Y, an LD 260M for performing exposure for M, an LD 260C for performing exposure for C, an LD 260K for performing exposure for K, an index sensor 266Y for Y, an index sensor 266M for M, an index sensor 266C for C, and an index sensor 266K for K.

In this case, the writing unit circuit sections 200Y to 200K are circuit sections for the writing units 20Y to 20K for forming electrostatic latent images on the surfaces of the photosensitive drums 10Y to 10K by scanning laser beams in accordance with pieces of image information of the respective colors.

Although FIG. 11 shows the detailed arrangement of the writing unit circuit section 200Y, the remaining writing unit circuit sections 200M, 200C, and 200K have the same arrangement.

Referring to FIG. 11, the writing unit circuit section 200Y has a dot clock adjusting section 210 which is a characteristic feature of the third embodiment, an image processing section 220 for performing image processing, and an LD driving section 230 for generating an LD driving signal in accordance with a dot clock on the basis of an image processing result.

Assume that a color misregistration sensor 270c is placed to detect pixel offsets at three or more positions in the main scanning direction and read predetermined test patterns of the respective color after fixing.

The arrangement and operation of the dot clock adjusting section 210 will be sequentially described below. Not that the dot clock adjusting section 210 is a clock generating section in the claims. The dot clock adjusting section 210 is comprised of a clock generating section 211 for generating a fundamental clock and a frequency changing section 212 capable of changing the frequency of the fundamental clock generated by the clock generating section 211. In this case, the frequency changing section 212 changes the leading or trailing edge timing or frequency of a dot clock to a desired timing such as a given timing during scanning of one line or a timing corresponding to each image printing surface or image printing color in order to change the position of a pixel printed in accordance with the dot clock. In the third embodiment, the frequency changing section 212 is formed from a digital delay type dot clock adjusting device, and is comprised of (A), (B), (C), and (D) described below.

(A) Delay Signal Generation:

A delay chain section 213 is a delay element group for obtaining a plurality of delay signals (delay signal group: in FIG. 11) having slightly different phases from each other by delaying an input signal (the fundamental clock from the clock generating section 211).

In this case, in the delay chain section 213, delay elements are preferably cascaded in the form of a chain to connect a sufficient number of delay elements to generate delay signals having slightly different phases from each other over two fundamental clock periods.

Although the clock generating section 211 may be incorporated in each of clock generating circuits for the respective colors, i.e., Y, M, C, and K, fundamental clocks may be distributed from the single clock generating section 211 to the clock generating circuits for the respective colors. As shown in FIG. 14, the index sensor 266Y detects a reference position in scanning of a laser beam.

(B) Synchronization Detection:

A synchronization detecting section 214 is a detecting section which receives the index signal generated by the index sensor 266Y and detects the ordinal number of a delay signal (synchronization point), of a delay signal group (in FIG. 11), which is synchronized with the index signal. This section outputs synchronization point information (in FIG. 11).

In this case, the synchronization detecting section 214 preferably outputs first synchronization point information SP1 indicating a delay signal, of the delay signal group (in FIG. 11), which is synchronized first with the index signal, and second synchronization point information SP2 indicating a delay signal synchronized next with the index signal.

Since a plurality of delay signals from the delay chain section 213 may greatly vary in delay time due to the influences of temperature changes and the like, how many delay signals are included in a predetermined unchanging time (the time interval between an index signal and another index signal) is detected in advance in this manner.

(C) Selection Control:

A selection control section 215 obtains a synchronization correction amount on the basis of synchronization point information (in FIG. 11) from the synchronization detecting section 214 and frequency offset information (in FIG. 11) from the CPU 201, and outputs a select signal (in FIG. 11) indicating a delay signal having a specific phase which is to be selected from a delay signal group (in FIG. 11). The frequency offset information will be described later.

(D) Selection:

A selecting section 216 receives a select signal in FIG. 11) from the selection control section 215, and selects a delay signal having a corresponding phase from a delay signal group (in FIG. 11). The selecting section 216 then generates a rectangular wave by setting the selected delay signal as leading and trailing edges, and outputs the rectangular wave as a dot clock (in FIG. 11).

In this manner, the period of a dot clock is slightly increased or decreased by setting a delay signal having a selected timing as leading and trailing edges in generating a dot clock, thereby generating a signal whose pulse count representing the number of pulses generated within a predetermined period of time is set to a predetermined count.

That is, the pulse count within the predetermined period of time is set to the predetermined count by sequentially selecting delay signals, whose phases (the positions or timings of the pulses of a dot clock) are finely and gradually changed, within a predetermined period of time without changing the clock frequency itself instead of making adjustment by finely adjusting the oscillation frequency of a fundamental clock oscillated and generated by the clock generating section 211.

In this manner, the period of a dot clock is slightly increased or decreased by setting a delay signal having a selected timing as leading and trailing edges in generating a dot clock. This can realize (a) and (b) described below.

(a) Generating a signal having a predetermined number of pulses generated in a predetermined period of time makes the length of each line in the main scanning direction uniform and makes the length between the start and the end of each line constant.

(b) The timing of a dot clock is adjusted at three or more positions in the main scanning direction by using pieces of error information at the three or more positions in the main scanning direction, thereby suppressing pixel offsets among the respective colors including intermediate portions.

Not only but also, which is unfeasible in the prior art, can be realized by sequentially selecting delay signals, whose phases (the positions or timings of the pulses of a dot clock) are finely and gradually changed, within a predetermined period of time without changing the clock frequency itself instead of making adjustment by finely adjusting the oscillation frequency of a fundamental clock oscillated and generated by the clock generating section 211.

<Principle (3) of Offset Detection for Dot Clock Adjustment>

The manner of offset detection in the third embodiment will be briefly described below with reference to the flow chart of FIG. 12 and the schematic view of FIG. 3.

Figure 12:
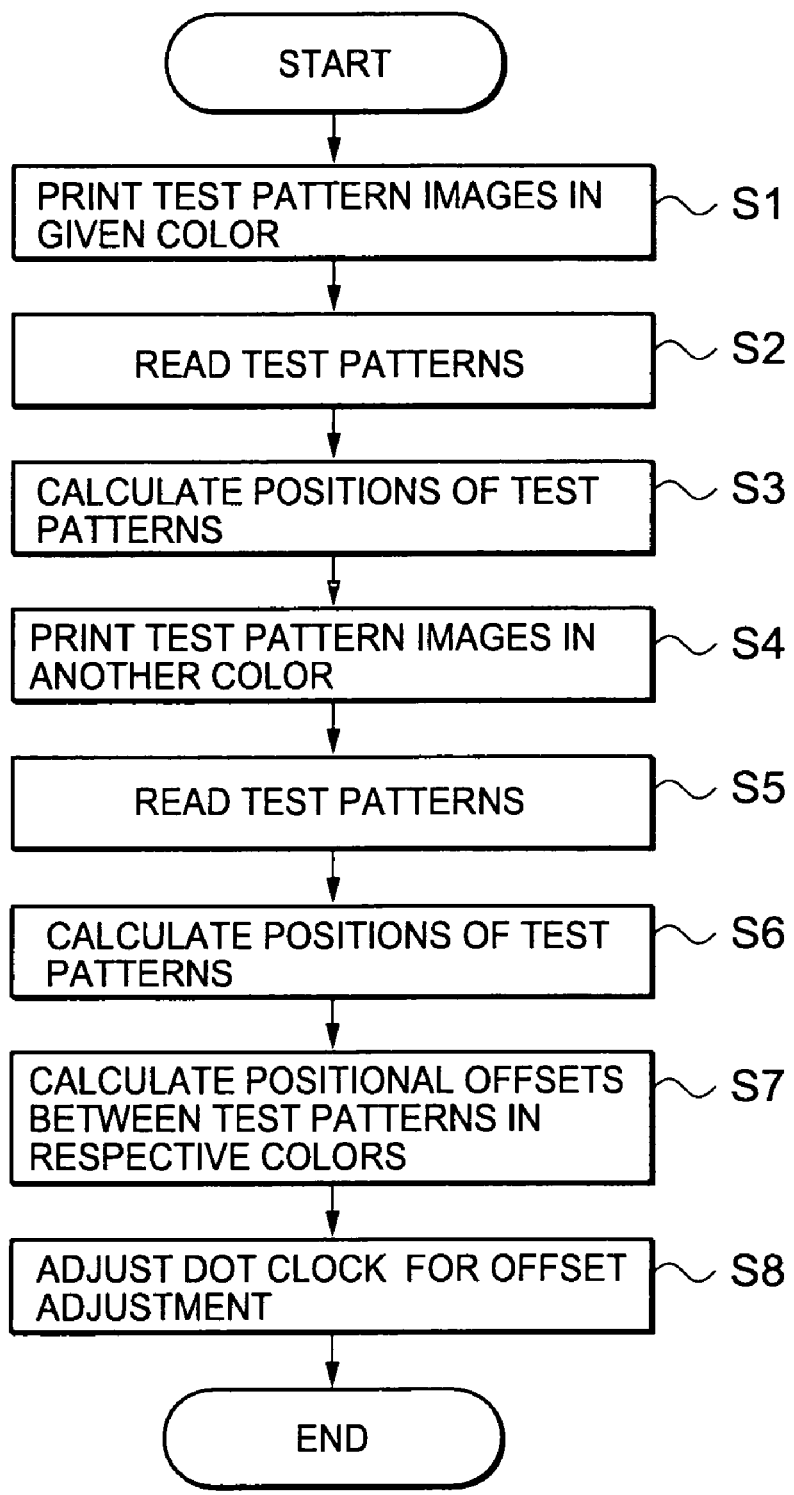
FIG. 12 is a flow chart for explaining the operation of the image printing apparatus according to the third embodiment.

At the time of offset detection, the writing unit circuit section 200 generates images with predetermined patterns stored in a ROM 221 at a total of three or more positions, i.e., the start position, end position, and intermediate position on the intermediate transfer member belt 40 in the main scanning direction (S1 in FIG. 12). FIG. 3 shows a case wherein patterns in the form of the Katakana character "ア" are printed as predetermined patterns at three positions in the main scanning direction.

Assume that although the patterns indicated by the solid lines are actually printed on the image recording sheet, the patterns indicated by the broken lines were expected to be printed.

In this case, offsets dx1, dx2, and dx3 have occurred in the main scanning direction due to the aberrations of the writing unit and the respective optical systems and the like. When these patterns are read by the color misregistration sensor 270c disposed at a position where it can read the patterns on the image recording sheet while the intermediate transfer member belt 40 is moved in the sub-scanning direction (S2 in FIG. 12), a distance Y1' from the horizontal line to the oblique line of the pattern in the form of the Katakana character "ア" includes an offset dy1, and distances Y2' and Y3' respectively include offsets dy2 and dy3.

Letting è be the angle defined by the horizontal and oblique lines, dx1=dy1/tanè. In addition, the offset dy1 can also be obtained from the moving speed of the image carrier in the sub-scanning direction and the difference between the times when the horizontal and oblique lines are read.

Likewise, letting è be the angle defined by the horizontal and oblique lines, dx2=dy2/tanè. Furthermore, the offset dy2 can be obtained from the moving speed of the image carrier in the sub-scanning direction and the difference between times when the horizontal and oblique line are read.

Likewise, letting a be the angle defined by the horizontal and oblique lines, dx3=dy3/tanè. Furthermore, the offset dy3 can be obtained from the moving speed of the image carrier in the sub-scanning direction and the difference between times when the horizontal and oblique line are read.

In the above manner, the positions of the test patterns (offset states) are calculated by the CPU 201 (S3 in FIG. 12).

For the remaining colors, in the same manner as described above, test patterns are printed (S4 in FIG. 12), the test patterns are read by the color misregistration sensor 270c (S5 in FIG. 12), and the positions (offset states) of the test patters are calculated (S6 in FIG. 12). The CPU 201 then compares the positions (offset states) of the test patterns in the respective colors to calculate pixel offset states for the respective colors (S7 in FIG. 12).

Note that the CPU 201 may calculate pixel offset states for the respective colors by comparing the positions (offset states) of the test patters of the respective colors with the reference distances based on the test patterns.

Therefore, by printing and reading such predetermined patterns of the respective colors, i.e., Y, M, C, and K, at the same position in the sub-scanning direction and three or more positions in the main scanning direction, e.g., at the start side in the main scanning direction, the end side in the main scanning direction, and an intermediate position therebetween, the CPU 201 can detect offset states (frequency offset information) associated with the expansion/contraction of an image in the main scanning direction and pixel offsets in an intermediate portion.

The CPU 201 performs the above detection processing for the respective colors in this manner, and supplies frequency offset information (in FIG. 11) to the writing units 20Y to 20K.

Likewise, the CPU 201 can obtain image leading end offset information associated with the start position of an image in the main scanning direction by detecting the pattern in the form of the Katakana character "ア" on the start end side in the main scanning direction, and can supply the image leading end offset information to the writing unit.

In the above manner, in usual image printing operation, on the basis of frequency offset information representing pixel offset states for the respective colors, the dot clock adjusting section 210 generates dot clocks for eliminating the pixel offset states for the respective colors, thereby printing an image (S8 in FIG. 12)

<Operation for Color Misregistration Adjustment of Color Image Printing Apparatus>

As in the above correction, and more specifically, as described in the first embodiment with reference to FIGS. 4 to 6, offsets in the main scanning direction can be adjusted by using the digital delay type dot clock adjusting device. Setting the length of one main-scanning line of one of Y, M, C, and K as a reference length and matching the length of one main-scanning line of each of the remaining colors with the reference length to align the leading end positions of the respective lines can suppress color misregistration in printing a color image.

Figure 3:
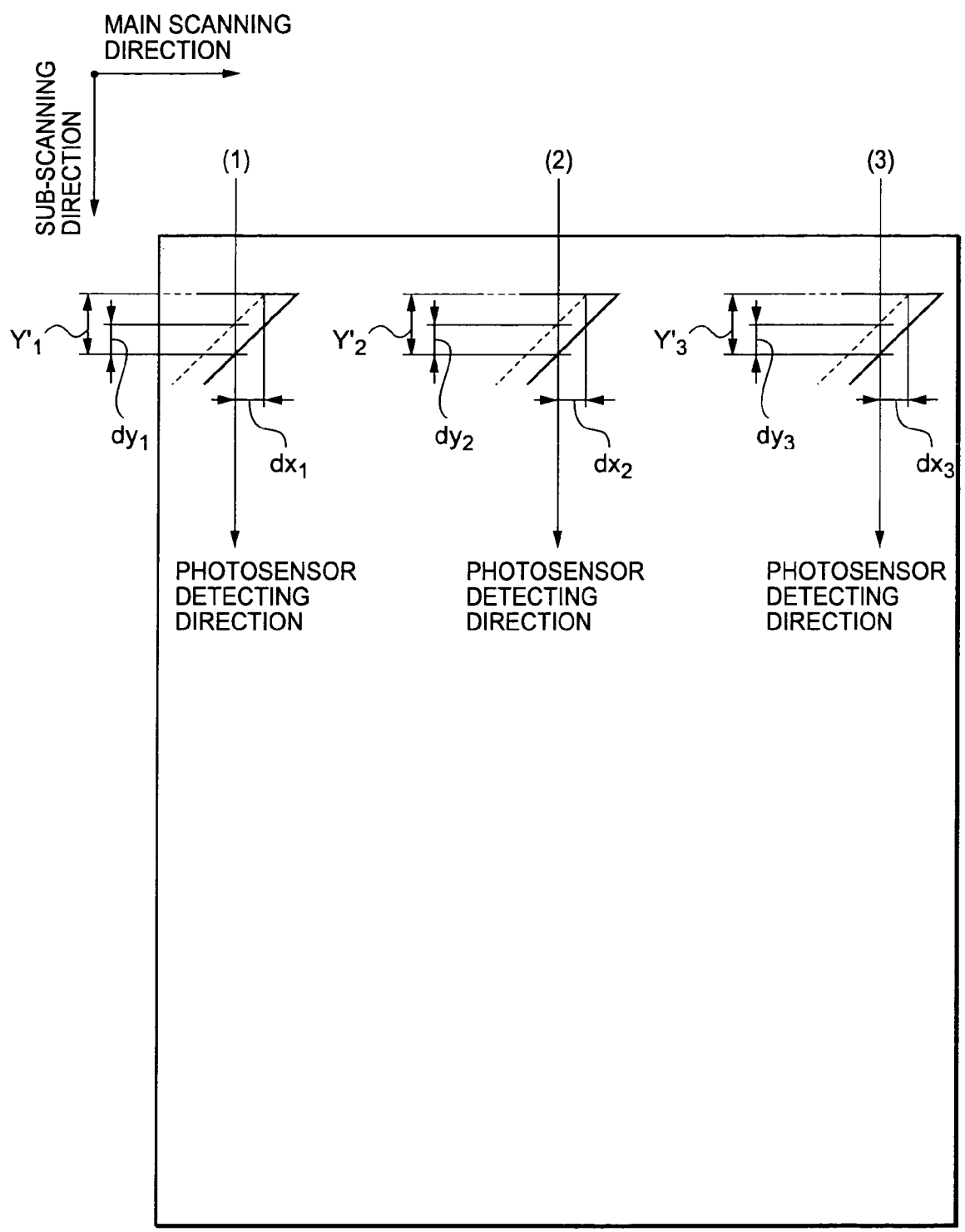
FIG. 3 is a timing chart for explaining how offset detection is performed in the image printing apparatus according to the first embodiment of the present invention.

That is, the leading end position and length of one line of a given color in the main scanning direction are measured by the technique shown in FIG. 3, and the dot clock adjusting section is so operated as to match the leading positions and lengths of lines of the remaining colors in the main scanning direction with those of the line of the given color. This allows the images of the respective colors to coincide with each other, thus eliminating color misregistration in the main scanning direction which is caused by various factors.

In this case, proper correction can be made for color misregistration and the length in the main scanning direction by performing control based on the characteristics shown in FIGS. 13A to 13E in accordance with the color misregistration that has currently occurred.

The use of the digital delay type dot clock adjusting section in the above manner can adjust an offset between the start and the end in the main scanning direction. A pixel offset for each color can be suppressed by adjusting the timing of a dot clock at three or more positions in the main scanning direction using pieces of error information at three or more positions in the main scanning direction for each color.

The above specific example has exemplified the case of the test patterns at the three positions. However, increasing the number of test patterns will suppress obverse/reverse pixel offsets more finely. If, for example, test patterns are printed at four positions, obverse/reverse pixel offset suppression can be done in areas on the left end portion/near the center/on the right end portion. That is, offset correction can be done at three positions by using test patterns at four positions, thereby obtaining a better result.

This embodiment uses the digital circuit arrangement having no analog feedback circuit such as a PLL. This circuit and other digital circuit portions can therefore be integrated into one chip. This makes it possible to perform obverse/teverse pixel offset elimination with higher precision.

Letting L be the number of pixels per line in the main scanning direction which are used for image printing, L1 to Ln−1 be the numbers of pixels in the respective ranges divided by n test patterns (n is equal to or more than 3), and N1 to Nn−1 be the offset amounts calculated between the three or more test patterns, it is preferable that an offset correction amount Nj/Lj (where 1 j n) between each pair of test patterns be evenly distributed to the respective pixels between each pair of test patterns so as to be reflected in the selection of a delay count for a dot clock.

In this manner, error information is detected at three or more positions in the main scanning direction and is evenly distributed to the respective pixels between each pair of test patterns so as to be reflected in the selection of a delay count for a dot clock. This can align the starts and the ends of the respective lines and properly perform pixel offset adjustment in a halfway portion.

In the third embodiment described above, the CPU 201 is externally provided for the dot clock adjusting section. However, the dot clock adjusting section may incorporate controllers such as CPU and tables.

As described above in detail above, according to the third embodiment, when a dot clock is generated for each of a plurality of colors used to print an image, and exposure for each color is to be performed on the basis of the dot clock, a plurality of delay clocks are generated by finely delaying a fundamental clock, and the manner of selection for the plurality of delay clocks is changed to change the leading edge timing or trailing edge timing of the dot clock generated for a color for which an offset should be adjusted. In this state, an image printed in a given color (or the desired value of image data of a test pattern) is set as a reference, and test patterns are printed at three or more positions in the main scanning direction with respect to image offsets of the remaining colors, thereby detecting error information associated with color misregistration. The selection of a plurality of delay clocks in the above digital delay type dot clock adjusting device is controlled on the basis of the error information, thereby correcting the offset. Since this embodiment uses the digital circuit arrangement having no analog feedback circuit such as a PLL, the circuit and other digital circuit portions can be integrated into one chip. This makes it possible to perform color misregistration elimination with higher precision. In addition, in the third embodiment, offset correction is executed upon detection of error information at three or more positions in the main scanning direction. This can align the starts and the ends of the respective lines and adjust a pixel offset in an intermediate portion.

According to the third embodiment, in the digital delay type dot clock adjusting device, the delay chain section generates a plurality of delay clocks by finely delaying a fundamental clock, and the synchronization detecting section detects synchronization information. The selection control section then generates a select signal from the synchronization information and error information. The selecting section selects a delay clock corresponding to the select signal from a plurality of delay signals and outputs it as a dot clock. Since the digital delay type dot clock adjusting device has a digital circuit arrangement having no analog feedback circuit such as a PLL, the circuit and other digital circuit portions can be integrated into one chip. This makes it possible to perform high-precision color misregistration elimination.

The third embodiment includes digital delay type dot clock adjusting devices as independent circuits for the respective colors for which color misregistration should be performed. This makes it possible to perform high-precision color misregistration elimination.

In the third embodiment, the offset detecting section, digital delay type dot clock adjusting device, and controller are formed from digital circuits. These sections can perform color misregistration elimination with high precision in a state wherein they are suitable for integration into one chip.

In the third embodiment, since the image printing apparatus operates under the control of a controller such as a CPU externally provided for the digital delay type dot clock adjusting device, color misregistration elimination can be performed with high precision.

In the third embodiment, since the image printing apparatus operates under the control of a controller such as a CPU incorporated in the digital delay type dot clock adjusting device, color misregistration elimination can be done with high precision by the digital delay type dot clock adjusting device in a state wherein the device is suitable for integration into one chip.

The third embodiment described above is directed to color misregistration correction. If, however, a pattern in the form of the Katakana character "ﾌ" to be printed on the start side in the main scanning direction is placed as near the end portion at the start position in the main scanning direction as possible, and image leading end offset information associated with the start position of an image in the main scanning direction is supplied to the selection control section 215 in the writing unit circuit section 200, the start positions of the respective lines in the main scanning direction can be aligned.

According to the above description of the third embodiment, color misregistration is detected by the color misregistration sensor 270*c*, and an offset is set. In addition to this operation, the CPU 201 may analyze the image data obtained by making a scanner (not shown) read an image recording sheet on which test patterns are printed, and set an offset. Alternatively, an operator may measure an image recording sheet on which test patterns are printed, and set an offset obtained from the measurement result with respect to the CPU 201 with an operating section (not shown).

Other Embodiments

In the first, second, and third embodiments, the electrophotographic image printing apparatuses using laser beams have been described. However, the present invention is not limited to this. For example, each embodiment of the present invention can be applied to various kinds of image forming apparatuses such as a laser imager for exposing a sheet of photographic paper to a laser beam and an inkjet printer which discharges ink from a head, and good results can be obtained.

What is claimed is:

1. An image printing apparatus comprising:
    clock generating means for generating a dot clock as a basis of each pixel forming an image;
    image printing means for printing a one-line image in a main scanning direction in accordance with image data with reference to the dot clock output from said clock generating means, and for printing a one-page image by repeating, in a sub-scanning direction, the one-line image printing performed in the main scanning direction; and
    a clock control section which changeably controls a frequency of the dot clock during scanning of one line in the main scanning direction;
    wherein said clock control section controls a number of pixels of one line in the main scanning direction in a case in which the frequency of the dot clock is changed during scanning of the one line to be equal to a number of pixels of one line in the main scanning direction in a case in which the frequency of the dot clock is not changed during scanning of the one line.

2. An apparatus according to claim 1, wherein said clock control section changes the frequency of the dot clock during scanning of one line in the main scanning direction based on a plurality of partial main-scanning offsets in a test image printed by said image printing apparatus in accordance with test image data.

3. An apparatus according to claim 1, further comprising offset setting means for setting at least two offsets between distances between test patterns in test images printed by said image printing apparatus in accordance with test image data having test patterns arranged at at least three positions in the main scanning direction and reference distances between comparative test patterns, and wherein said clock control section changes the frequency of the dot clock during scanning of one line in the main scanning direction based on the respective offsets set by said offset setting means.

4. An apparatus according to claim 3, wherein said clock control section changes the frequency of the dot clock to evenly distribute the offsets to the respective pixels between the test patterns so as to eliminate the offsets.

5. An apparatus according to claim 1, wherein said clock generating section comprises a fundamental clock generating section which generates a fundamental clock having a predetermined frequency, and a frequency changing section which is adapted to change the frequency of the fundamental clock generated by said fundamental clock generating section; and wherein said clock control section changes a frequency of a fundamental clock output from said frequency changing section during scanning of one line in the main scanning direction.

6. An apparatus according to claim 5, wherein said frequency changing section includes a delay line which generates delay clocks by digitally delaying the fundamental clock, and said clock control section changes the frequency of the dot clock during scanning of one line in the main scanning direction by selecting a predetermined delay clock from the delay line.

7. An image printing apparatus comprising:

clock generating means for generating a dot clock as a basis of each pixel forming an image;

image printing means for printing a one-line image in a main scanning direction in accordance with image data with reference to the dot clock output from said clock generating means, and for printing a one-page image by repeating, in a sub-scanning direction, the one-line image printing performed in the main scanning direction; and a clock control section which changeably controls a frequency of the dot clock during scanning of one line in the main scanning direction;

wherein said clock control section changes the frequency of the dot clock during scanning of one line in the main scanning direction based on a plurality of partial main-scanning offsets in a test image printed by said image printing apparatus in accordance with test image data.

8. An image printing apparatus comprising:

clock generating means for generating a dot clock as a basis of each pixel forming an image; image printing means for printing a one-line image in a main scanning direction in accordance with image data with reference to the dot clock output from said clock generating means, and for printing a one-page image by repeating, in a sub-scanning direction, the one-line image printing performed in the main scanning direction;

a clock control section which changeably controls a frequency of the dot clock during scanning of one line in the main scanning direction; and offset setting means for setting at least two offsets between distances between test patterns in test images printed by said image printing apparatus in accordance with test image data having test patterns arranged at at least three positions in the main scanning direction and reference distances between comparative test patterns;

wherein said clock control section changes the frequency of the dot clock during scanning of one line in the main scanning direction based on the respective offsets set by said offset setting means.

9. An apparatus according to claim 8, wherein said clock control section changes the frequency of the dot clock to evenly distribute the offsets to the respective pixels between the test patterns so as to eliminate the offsets.

10. An apparatus according to claim 9, further comprising:

test pattern interval detecting means for computing distances between the test patterns in the test images by detecting positions of the test patterns; and offset computing means for computing offsets between the distances between the test patterns which are computed by said test pattern interval detecting means and the reference distances between the comparative test patterns, wherein at least two offsets computed by said offset computing means are set by said offset setting means.

11. An apparatus according to claim 9, wherein the reference distances are distances between the test patterns in the test image data.

12. An apparatus according to claim 9, wherein said image printing apparatus prints images on two surfaces of an image recording sheet, and said clock control section changes the frequency of the dot clock when an image is printed on one surface of the image recording sheet or images are printed on the two surfaces.

13. An apparatus according to claim 9, wherein said image printing apparatus prints an image by superimposing an image formed in a first color and an image formed in a second color different from the first color, and said clock control section changes the frequency of the dot clock when one or both of images in the first and second colors are to be printed.

14. An apparatus according to claim 8, further comprising:

test pattern interval detecting means for computing distances between the test patterns in the test images by detecting positions of the test patterns; and offset computing means for computing offsets between the distances between the test patterns which are computed by said test pattern interval detecting means and the reference distances between the comparative test patterns, wherein at least two offsets computed by said offset computing means are set by said offset setting means.

15. An apparatus according to claim 14, wherein the reference distances are distances between the test patterns in the test image data.

16. An apparatus according to claim 14, wherein said image printing apparatus prints images on two surfaces of an image recording sheet, and said clock control section changes the frequency of the dot clock when an image is printed on one surface of the image recording sheet or images are printed on the two surfaces.

17. An apparatus according to claim 14, wherein said image printing apparatus prints an image by superimposing an image formed in a first color and an image formed in a second color different from the first color, and said clock control section changes the frequency of the dot clock when one or both of images in the first and second colors are to be printed.

18. An apparatus according to claim 8, wherein the reference distances are distances between the test patterns in the test image data.

19. An apparatus according to claim 8, wherein said image printing apparatus prints images on two surfaces of an image recording sheet, and said clock control section changes the frequency of the dot clock when an image is printed on one surface of the image recording sheet or images are printed on the two surfaces.

20. An apparatus according to claim 19, wherein the reference distances are distances between the test patterns in the test image data or distances between test patterns in test image data printed on a reverse surface of an image recording sheet when the frequency of the dot clock is changed in printing an image on an obverse surface of the image recording sheet, or the reference distances are distances between the test patterns in the test image data or distances between test patterns in test image data printed on the obverse surface of the image recording sheet when the frequency of the dot clock is changed in printing an image on the reverse surface of the image recording sheet.

21. An apparatus according to claim 8, wherein said image printing apparatus prints an image by superimposing an image formed in a first color and an image formed in a second color different from the first color, and said clock control section changes the frequency of the dot clock when one or both of images in the first and second colors are to be printed.

22. An apparatus according to claim 21, wherein the reference distances are distances between the test patterns in the test image data or distances between test patterns in test image data printed in the second color when the frequency of the dot clock is changed in printing an image in the first color, or the reference distances are distances between the test patterns in the test image data or distances between test patterns in test image data printed in the first color when the frequency of the dot clock is changed in printing an image in the second color.

23. An image printing apparatus comprising:
clock generating means for generating a dot clock as a basis of each pixel forming an image;
image printing means for printing a one-line image in a main scanning direction in accordance with image data with reference to the dot clock output from said clock generating means, and for printing a one-page image by repeating, in a sub-scanning direction, the one-line image printing performed in the main scanning direction; and
a clock control section which changeably controls a frequency of the dot clock during scanning of one line in the main scanning direction;
wherein said clock generating section comprises a fundamental clock generating section which generates a fundamental clock having a predetermined frequency, and a frequency changing section which is adapted to change the frequency of the fundamental clock generated by said fundamental clock generating section; and
wherein said clock control section changes a frequency of a fundamental clock output from said frequency changing section during scanning of one line in the main scanning direction.

24. An apparatus according to claim 23, wherein said frequency changing section includes a delay line which generates delay clocks by digitally delaying the fundamental clock, and said clock control section changes the frequency of the dot clock during scanning of one line in the main scanning direction by selecting a predetermined delay clock from the delay line.

* * * * *